(12) United States Patent
Loh

(10) Patent No.: US 12,428,321 B1
(45) Date of Patent: Sep. 30, 2025

(54) OZONE GENERATION ASSEMBLY AND APPLICABLE DEVICES AND APPLIANCES

(71) Applicant: LIVING OZONE LLC, Redmond, WA (US)

(72) Inventor: Candice Choohong Loh, Redmond, WA (US)

(73) Assignee: LIVING OZONE LLC, Redmond, WA (US)

( * ) Notice: Subject to any disclaimer, the term of this patent is extended or adjusted under 35 U.S.C. 154(b) by 0 days.

(21) Appl. No.: 18/939,261

(22) Filed: Nov. 6, 2024

Related U.S. Application Data

(60) Provisional application No. 63/565,554, filed on Mar. 15, 2024.

(51) Int. Cl.
    *C02F 1/78*      (2023.01)
    *C02F 1/461*     (2023.01)

(52) U.S. Cl.
    CPC .................... *C02F 1/461* (2013.01)

(58) Field of Classification Search
    CPC .......... C02F 1/461; C02F 1/78; C02F 1/4672; C02F 2307/14; C02F 2001/46142; C02F 2201/4614; C02F 1/4618; C02F 2201/46115; C02F 2001/46185; C25B 1/46; C25B 9/19; C25B 13/02; C25B 13/04; C25B 9/23; C25B 11/091; C25B 11/052; C25B 11/063; C25B 1/13; A61L 2/035; A61L 2/183; A61L 2202/11
    See application file for complete search history.

(56) References Cited

U.S. PATENT DOCUMENTS

| | | | |
|---|---|---|---|
| 6,984,295 B2 | 1/2006 | Shiue | |
| 8,308,914 B2 | 11/2012 | Hsu | |
| 9,248,208 B2 | 2/2016 | Li | |
| 9,757,697 B2 | 9/2017 | Hsu | |
| 2016/0215402 A1* | 7/2016 | Takahashi | C02F 1/4618 |
| 2021/0101810 A1* | 4/2021 | Hsu | C25B 11/091 |

* cited by examiner

Primary Examiner — Xiuyu Tai
(74) Attorney, Agent, or Firm — WPAT, PC

(57) ABSTRACT

An ozone generation assembly comprising: a base part; two or more electrode plates in parallel to a plane; electric coupling heads which are arranged in vias of the base part so as both ends of each of the electric coupling heads are in opposite sides of the base part, respectively, wherein the electric coupling heads are configured to receive electricity from a circuitry part of the ozone generator; and one or more supporting parts configured for fixing the electrode plates to the base part, wherein the electrode plates are electrically connected with the electric coupling heads.

19 Claims, 17 Drawing Sheets

OZONE GENERATION ASSEMBLY AND APPLICABLE DEVICES AND APPLIANCES

CROSS REFERENCE TO RELATED PATENT APPLICATION

This patent application is based on a provisional patent application No. 63/565,554 filed on Mar. 15, 2024.

FIELD OF THE INVENTION

The present invention relates to ozone generation modules, and more particularly, to hygiene devices and appliances adopting the ozone generation modules.

BACKGROUND OF THE INVENTION

Generally, a varieties of hygiene devices and appliances are known. There is a continuing need for new ways to keep hygiene devices and appliances odor-free, germ-free, and to enhance the functions of these hygiene devices and appliances.

Usually, chemical substances or solutions are used to satisfy the needs. However, users need to buy and fill the chemical substances or solution into the hygiene devices and appliances. And after using the hygiene devices and appliances, users must clean the chemical substances or solution out of the devise and appliances to prevent them from corrosion. Besides, the chemical substances or solutions may deteriorate after an expiry time. In other words, users need to serve the devices and appliances in addition to themselves.

Therefore, there exists a need for a hygiene devices and appliances free of chemical substances and solutions and having odor-removal, sterilization, disinfection, germ-free, and etc, functions with minimum service.

The disclosed embodiments may seek to satisfy one or more of the above-mentioned needs. Although the present embodiments may obviate one or more of the above-mentioned needs, it should be understood that some aspects of the embodiments might not necessarily obviate them.

SUMMARY OF THE INVENTION

According to an embodiment of the present application, an ozone generation assembly of an ozone generator is provided. The ozone generation assembly comprising: a base part; two or more electrode plates in parallel to a plane; electric coupling heads which are arranged in vias of the base part so as both ends of each of the electric coupling heads are in opposite sides of the base part, respectively, wherein the electric coupling heads are configured to receive electricity from a circuitry part of the ozone generator; and one or more supporting parts configured for fixing the electrode plates to the base part, wherein the electrode plates are electrically connected with the electric coupling heads.

Preferably, in order to enclose the electrode plates in the ozone generation assembly 400, the ozone generation assembly further comprises: a bottom covering part attached to a surface of the base part, wherein first ends of the electric coupling heads are encircled by the bottom covering part, wherein the supporting part for enclosing the electrode plates; and a top covering part, wherein the plane is perpendicular to the surface of the base part, and wherein the top covering part and the bottom covering part are configured for enclosing the supporting part, the electrode plates, and the circuits.

Preferably, in order to electrically connect to the circuitry part of the ozone generator, the ozone generation assembly further comprise conductive circuits bent perpendicularly; and conductive screws, wherein first ends of the conductive circuits are electrically coupled to the first ends of the electric coupling heads, respectively, wherein second ends of the conductive circuits having openings, wherein the supporting part has corresponding openings such that the conductive screws are in touch with the electrode plates via the openings of the conductive circuits and the openings of the supporting part, respectively.

Preferably, in order to prevent leakage from the ozone generation assembly to the underneath, wherein the ozone generation assembly further comprises an O-ring seal around the base part.

Preferably, in order to fix the top covering part to the bottom covering part, wherein the top covering part has one or more fastens and the bottom covering part has one or more corresponding fastens such that the top and bottom covering parts are attached to each other by the fastens.

Preferably, to enclose the electrode plates in the ozone generation assembly 600, the ozone generation assembly further comprises: one or more dielectric supporting parts lie in between the electrode plates, wherein a surface of the base part is in parallel to the plane, wherein a first corner of a first one of the electrode plates is electrically coupled to one of the electric coupling heads protruding out of the surface, a second corner of the first one of the electrode plates diagonal to the first corner diagonal to the first corner of the first one of the electrode plates is missed, wherein a second corner of the second one of the electrode plates is electrically coupled to another one of the electric coupling heads, wherein the missed second corner of the first one of the electrode plates makes room for said another one of the electric coupling heads.

Preferably, in order to enclose a third electrode plate in the ozone generation assembly 600, wherein a first corner of the second one of the electrode plates is missed, wherein a first corner of a third one of the electrode plates is electrically coupled to the one of the electric coupling heads, wherein the missed first corner of the second one of the electrode plates makes room for the one of the electric coupling heads.

Preferably, in order to enclose the electrode plates, the ozone generation assembly further comprises a top covering part, wherein the base part has a wall structure corresponding to the top covering part, wherein first ends of the electric coupling heads are encircled by the wall structure.

Preferably, in order to have openings to the water tank, wherein the top covering part has concentric openings.

Preferably, in order to increase surface areas of the electrode plates, wherein the electrode plates have holes.

Preferably, in order to support rectangular electrode plates, wherein the electrode plates are rectangular, wherein there are corner supporting parts on the surface of the base part for fixing four corners of the electrode plates.

Preferably, in order to support the first (bottom) one of the electrode plates, the ozone generation assembly further comprises base supporting parts on the surface of the base part, wherein the first one of the electrode plates is in contact with the base supporting parts.

Preferably, in order to let the electric coupling heads in contact with the electrode plates, wherein the one or more dielectric supporting parts are rectangular, and two diagonal corners of the one or more supporting parts are missing to make room for the electric coupling heads.

Preferably, in order to pump water via the ozone generation assembly 900, the ozone generation assembly further comprises: a top covering part having an opening as a water inlet, wherein the supporting part has a tube as a water outlet, wherein the top covering part is attached to the supporting part by hot melt glue to enclose the electrode plates, wherein the base part has an opening in the middle for placing the tube.

Preferably, in order to pump water via the ozone generation assembly 1100, the ozone generation assembly further comprises: a top covering part having an opening as a water inlet, wherein the base part has a wall structure in the perimeter, so as the top covering part is attached to the wall structure by hot melt glue to enclose the electrode plates, wherein the supporting part is a tube in the middle of the base part as a water outlet.

Preferably, in order to let the electric coupling heads in contact with the electrode plates, wherein the one or more dielectric supporting parts have an opening in the middle corresponding to the supporting part.

Preferably, in order to suck water from the bottom of the water tank, wherein the ozone generation assembly further comprises a pipe, wherein a first end of the pipe connects to the water outlet, and a second end of pipe is a weighted head.

According to an embodiment of the present application, an ozone-based water bottle is provided. The ozone-based water bottle comprising: a water tank; an electric compartment below the water tank; the aforementioned ozone generator; and a cap of the water tank, wherein the circuitry part is inside the electric compartment and the ozone generation assembly is installed in the opening of the electric compartment facing the water tank.

According to an embodiment of the present application, an ozone-based water irrigator is provided. The ozone-based water irrigator comprising: a water tank; an electric compartment on top of the water tank; the aforementioned ozone generator; a pump; and a nozzle on top of the electric compartment, wherein the circuitry part is inside the electric compartment and the ozone generation assembly is installed in the opening of the electric compartment facing the water tank, wherein the pump is configured to pump water from the water tank to the nozzle via the ozone generation assembly.

Preferably, in order to fill water into the water tank, the water tank has a cap underneath or in the lower part.

Preferably, in order to fill water into the water tank, the water tank is detachable from the water tank.

Preferably, in order to reduce volume of the water irrigator, the electric compartment is movable into the water tank.

According to an embodiment of the present application, an ozone-based toothbrush is provided. The ozone-based toothbrush comprising: a water tank; an electric compartment on top of the water tank; the aforementioned ozone generator; a pump; and a toothbrush part on top of the electric compartment, wherein the circuitry part is inside the electric compartment and the ozone generation assembly is installed in the opening of the electric compartment facing the water tank, wherein the pump is configured to pump water from the water tank to the toothbrush part via the ozone generation assembly.

Preferably, in order to fill water into the water tank, the water tank has a cap underneath or in the lower part.

Preferably, in order to fill water into the water tank, the water tank is detachable from the water tank.

According to an embodiment of the present application, an ozone-based humidifier is provided. The ozone-based humidifier comprising: a water tank; an electric compartment below the water tank; the aforementioned ozone generator; and a vapor nozzle, wherein the circuitry part is inside the electric compartment and the ozone generation assembly is installed in the opening of the electric compartment facing the water tank.

One of the advantages provided by the present application is to provide ozone solution in the devices or appliances such as ozone-based water bottle, water irrigator, toothbrush, and humidifier to sterilization, disinfection, odor removal, and personal health care and hygiene for environments.

Another one of the advantages provided by the present application is to provide a modular design of the ozone generation assembly of the ozone generator in the devices or appliances. This modularization can save user's money because the replaceable ozone generation assembly can be bought independently. Furthermore, the user can take the ozone generation assembly out of the devices or appliances to clean it.

BRIEF DESCRIPTION OF THE DRAWINGS

The advantages and spirit related to the present invention can be further understood via the following detailed description and drawings. It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE PREFERRED EMBODIMENT

Figure 1:
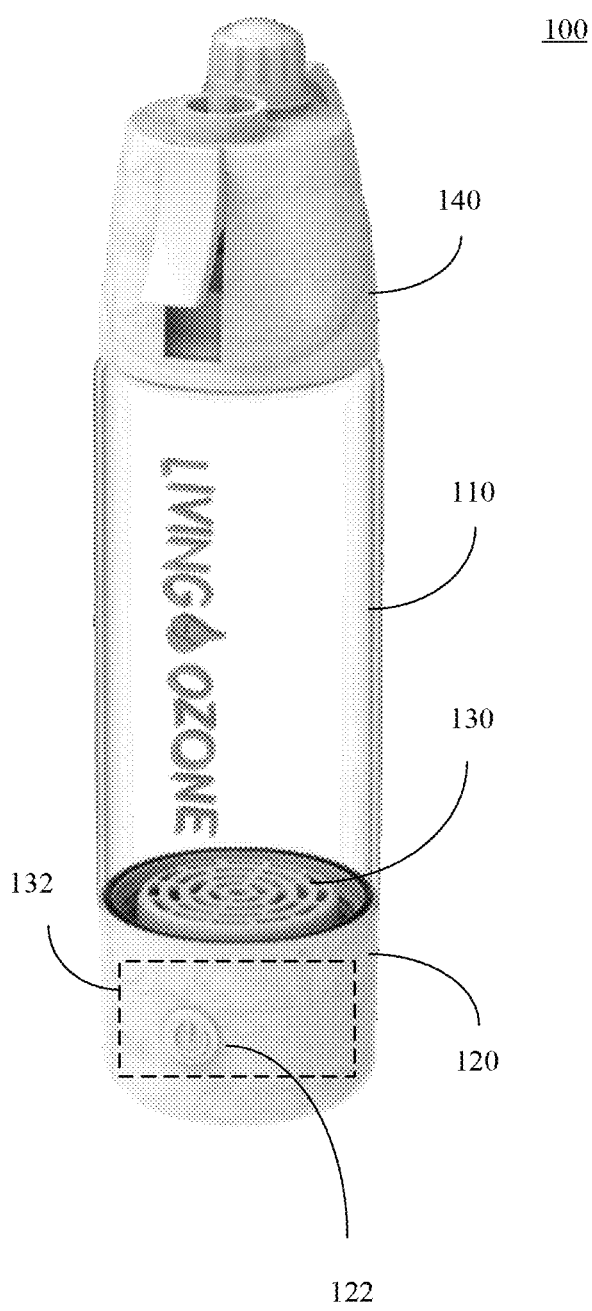
FIG. 1 is a perspective view of an embodiment of an ozone-based water bottle 100 according to the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

In the present application, hygiene devices and appliances including a water bottle, an irrigator, an electric toothbrush, and a humidifier are provided with at least one water tank and a least one ozone generator. The water applicable to the ozone generator may be tap water or distilled water. Favorable water quality may be total dissolved solid (TDS) 30~1000 ppm or electrical conductivity (EC) 60~2000 us/cm. However, persons having ordinary skill in the art may understand that ozone may be generation even when the water quality is not in the specified range. It only requires that no substances dissolved in the water can be electrolyzed to generate sufficient hazardous substances.

The ozone generator includes two parts. The first part is a circuitry part for providing electricity to electrodes of the second part. Power source of the first part may be a replaceable battery, a rechargeable battery, a high-capacity capacitor, and/or an alternative current power supply from utility company. The circuitry part may include AC to DC inverter, DC-DC converter, regulator, filter, converter, power amplifier, fuse, switch, battery charger, voltage detector, and any other electrical and electronic components. Persons having ordinary skill in the art may understand that the circuitry is configured to provide low voltage direct current to the electrodes of the second part of the ozone generator.

Physically, the first part of the ozone generator may be sealed against low water pressure. In one embodiment, the protection rating of the first part according to IEC 60529 may be compliant to IPx4 or more demanding standards. However, the first part may not be enclosed independently. The circuitry part may be arranged with other components such as a control circuitry, a pump, and a sensor etc. in a compartment of the devices or compliances provided by the present application. In this kind of arrangement, the compartment including the first part of the ozone generator may be compliant with IPx4 or more demanding standards.

The second part is an assembly which includes at least one anode electrode and at least one cathode electrode and circuits connected to the first part of the ozone generator. In this application, the second part of the ozone generator is referred to as an ozone generation assembly or an assembly in short.

The electrodes are installed inside the ozone generation assembly. There may be at least one water inlet and at least one water outlet in the ozone generation assembly. When the water passing through the electrodes, it is electrolyzed, and ozone is generated and dissolved in the water subsequently. The water exits from the water outlet may be considered as an ozone solution.

Alternatively, the ozone generation assembly may be opened to a water tank. The electrodes may be surrounded by or soaked under the water in the ozone generation assembly. The water around the electrodes is electrolyzed and ozone is generated and dissolved in the water. The water in the water tank may be considered as an ozone solution.

From the inlet to the outlet, the water current passing through the ozone generation assembly may be pumped by man-made force. The ozone solution may be also pumped out of the devices and appliances. The pump may be installed outside of the ozone generator, especially outside of the ozone generation assembly. However, the pump may be installed in front of the water inlet or in rear of the water outlet. The water inlet and/or outlet may be connected to pipes, respectively. For example, an end of the pipe connected with the water inlet may be a weighted head which is always dropped to the lowest place of the water tank by gravity to retrieve water.

In the present application, the anode and the cathode electrodes may be made as plates. They are substantially arranged in parallel to a plane. In an example, the electrode plates may be with multiple holes in increase their surface areas. In an example, the holes are evenly arranged. In another example, the holes have the same sizes. In another aspect, the hole may be used to connect to at least one conductive screw or electric connector to the circuitry of the first part of the ozone generator. However, the present application does not require that there must be holes in the electrode plates.

In order to prevent corrosion, the electrode plates may be made by precious metals like titanium, silver, or gold. In other embodiments, the electrode plates may be made by other conductive materials such as graphite or graphene. Alternatively, the electrode plates may be made of alloy such as stainless steel.

Each of the end products provided by the present application includes a water tank and an electric compartment. The first part of the ozone generator is resided in the electric compartment. And the ozone generation assembly is configured to be arranged interfaced with the water tank and the electric compartment. The ozone generation assembly of the end product is designed to be replaceable easily by user.

Hence, the ozone generation assembly has two sides. The first side of the ozone generation assembly includes an electric interface with the first part of the ozone generator. At least two electric coupling points or heads in the electric interface for connecting to a positive pole and a negative pole of the DC circuitry provided by the first part of the ozone generator, respectively. The electric coupling point being coupling to the positive pole connects with the anode electrode. Similarly, the electric coupling point being coupling to the negative pole connects with the cathode electrode of the ozone generation assembly.

The second side of the ozone generation assembly may include at least one water inlet for receiving water from the water tank. In this case, the first side of the ozone generation assembly may further include at least one water outlet. The water in the water tank passes through the water inlet into the ozone generation assembly. Eventually, the ozone solution generated by the ozone generation assembly exits the ozone generation assembly from the water outlet.

Alternatively, the second side of the ozone generation assembly is opened to the water tank such that the electrodes of the ozone generation assembly is directly exposed to the water of the water tank.

There may be one or more openings in between the water tank and the electric compartment. The ozone generation assembly is designed to be fit into the opening with the first side facing to the compartment and the second side facing to the water tank. As a result, the ozone generation assembly is further configured to completely seal the opening facing to the water tank in order to prevent the water leaking into the electric compartment from the opening.

A base part of the ozone generation assembly may be used to plug into the opening. The base part may be made of non-conductive material such as plastics. An elastic material may be surrounded with the base part to help to seal the leakage from the opening. The elastic material of the seal may be replaceable by the user. In addition, the electric coupling points or heads in the first side of the ozone generation assembly are also sealed by seal ring or any other kind of materials suitable for seal leakage.

The anode electrode plate and the cathode electrode plate in parallel with a plane are installed on the base part of the ozone generation assembly. In one embodiment, the plane may be in parallel with the opening in between the water tank and the electric compartment. In another embodiment, the plane may be perpendicular to the opening. Usually, the opening section is in parallel to a surface of the base part.

In the embodiment with the water inlet and outlet, there may be one or more covering parts for encapsulating the electrode plates and leaving at least one water inlet and at least one water outlet. The one or more covering parts may be attached to the base part by detachable fastens or screws. In some embodiment, the base part may be also used to enclose the electrode plates partially. For examples, some covering structures are like a wall in the perimeter or a compartmentalized open structure.

In the embodiment without the water inlet and outlet, there may be one or more covering parts for shielding the electrode plates such that an object in the water tank such as a tea bag, a spoon, or a finger would not directly in contact with the electrode plates. The one or more covering parts are designed for safety issues. Without the one or more covering parts, a metal spoon may be accidentally in contact with both the electrode plates to form a shorted circuit. Jeopardous event may be happened if no covering parts.

In order to reduce weight and to increase diffusion rate of the dissolved ozone, the one or more covering parts may have openings. The shape of the one or more covering part may be corresponding to the shape of the opening in between the water tank and the electric compartment. The one or more covering parts may be attached to the base part by detachable fastening or screws. In some embodiments, the one or more covering parts and the base part are integrated as a single base part in convenience.

For the purposes of installing the electrode plates, there may exists one or more supporting parts which may be bond with the parallel electrode plates. Moreover, the one or more supporting parts may connect with the base part with detachable fastenings or screws. In some cases, the conductive screws with optional seal rings or materials also serve as part of the circuits connecting with the electrode plates. In addition, the one or more supporting parts may be also played the role of the covering parts. Alternatively, the base part may be served to support the installation of the electrode plates, too.

Non-conductive material such as plastics may be used to construct the one or more covering parts. In one embodiment, the material of the one or more covering parts, the one or more supporting parts, and the base part may be the same. One or more dielectric supporting parts may be sandwiched by the parallel electrode plates to isolate them.

Ozone-Based Water Bottle

Please refer to FIG. 1, which is a perspective view of an embodiment of an ozone-based water bottle 100 according to the present application. The water bottle 100 comprises a water tank 110, an electric compartment 120, an ozone generator 130, and a cap 140. As shown in FIG. 1, the electric compartment 120 serves as a base of the water bottle 100. Generally, the water tank 110 and the electric compartment 120 looks like a cylinder.

The water tank 110 may be transparent. It may be made of plastics or glass which may contain water in 0~100 degree Celsius without dissipating hazardous materials. On the outer surface of the water tank 110, there may exist some forms of protruding strips, ridges or depressions for assisting user in holding the water tank. There may be trademarks or pictures on the outer surface of the water tank 110.

As shown in FIG. 1, the horizontal section of the water tank 110 is circular in general. There is a bottom opening in between the water tank 110 and the electric compartment 120. The ozone generation assembly or the second part of the ozone generator 130 is fit in the bottom opening. A top covering part of the ozone generation assembly can be seen in FIG. 1. Similarly, there is top opening in between the water tank 110 and the cap 140. After the cap 140 is attached to the water tank 110, the water tank 110 is sealed accordingly.

A replaceable or rechargeable battery, the circuitry or the first part 132 of the ozone generator 130, and a power switch 122 are located in the electric compartment 140. In some embodiments, a power cord for receiving electricity may be connected to the electric compartment 140. The electric compartment 120 may be detachable from the water tank 110 for convenience of replacing the ozone generation assembly of the ozone generator 130.

Once the user turns on the ozone generator 130 via the power switch 122 on the surface of the electric compartment, the ozone generator 130 is configured to electrolyze the water in the water tank 110 to make ozone solution. The ozone solution can help sterilization, disinfection, odor removal, and quality improvement of water etc.

Figure 2:
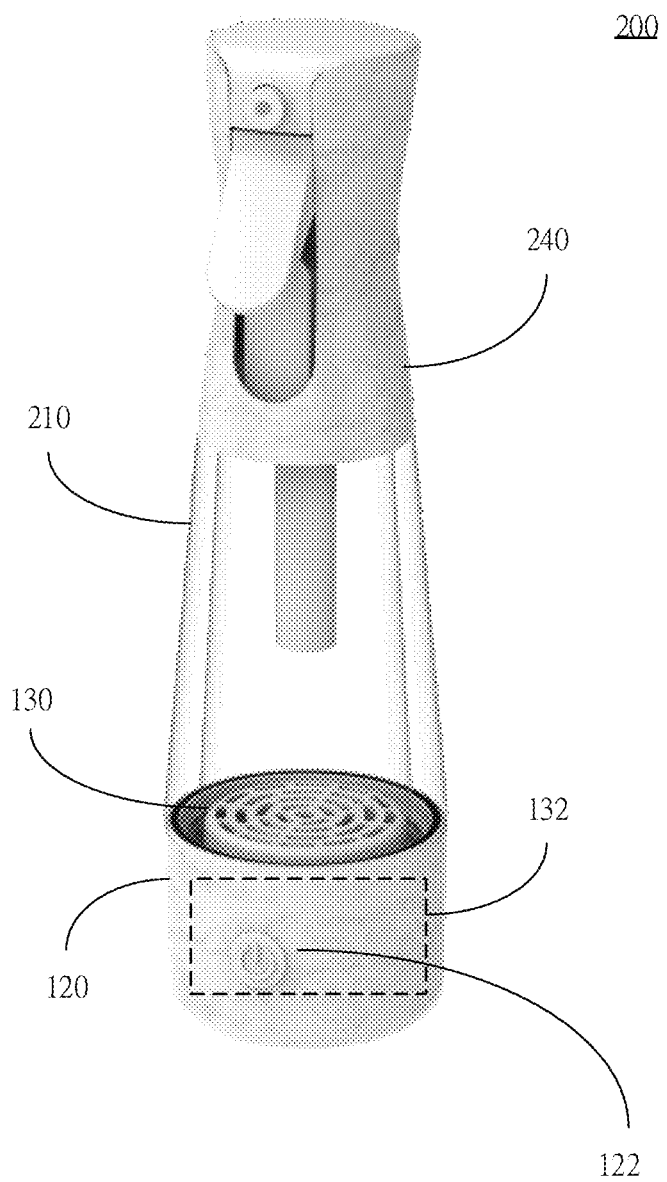
FIG. 2 is a perspective view of another embodiment of an ozone-based water bottle 200 according to the present application.

Please refer to FIG. 2, which is a perspective view of another embodiment of an ozone-based water bottle 200 according to the present application. The ozone-based water bottle 200 as shown in FIG. 2 shares the same electric compartment 140 and the ozone generator 130 with the ozone-based water bottle 100 as shown in FIG. 1. However, the ozone-based water bottle 200 includes a different kind of water tank 210 and a different kind of cap 240.

As shown in FIGS. 1 and 2, the cap 140 and the cap 240 have different designs and functions. However, the size of the bottom opening in between the water tank 210 and the electric compartment 140 is as the same as the size of the bottom opening in between the water tank 110 and the electric compartment 140. This means that the electric compartment 140 and the ozone generator 130 are designed in modularization. As long as the water tank has the same size of the bottom opening, a new kind of water bottle can be compatible with existing electric compartment 120 if adopting new designs of the water tank and the cap.

In the embodiments of the water bottles 100 and 200, the ozone generation assembly may not have water inlet and outlet because the electric compartment 120 is placed below the water tank 110. The electrode plates of the ozone generation assembly 130 may be arranged to be in parallel to a horizontal plane. The top covering part is arranged to shield the electrode plates from the object in the water tank 110.

Figure 3:
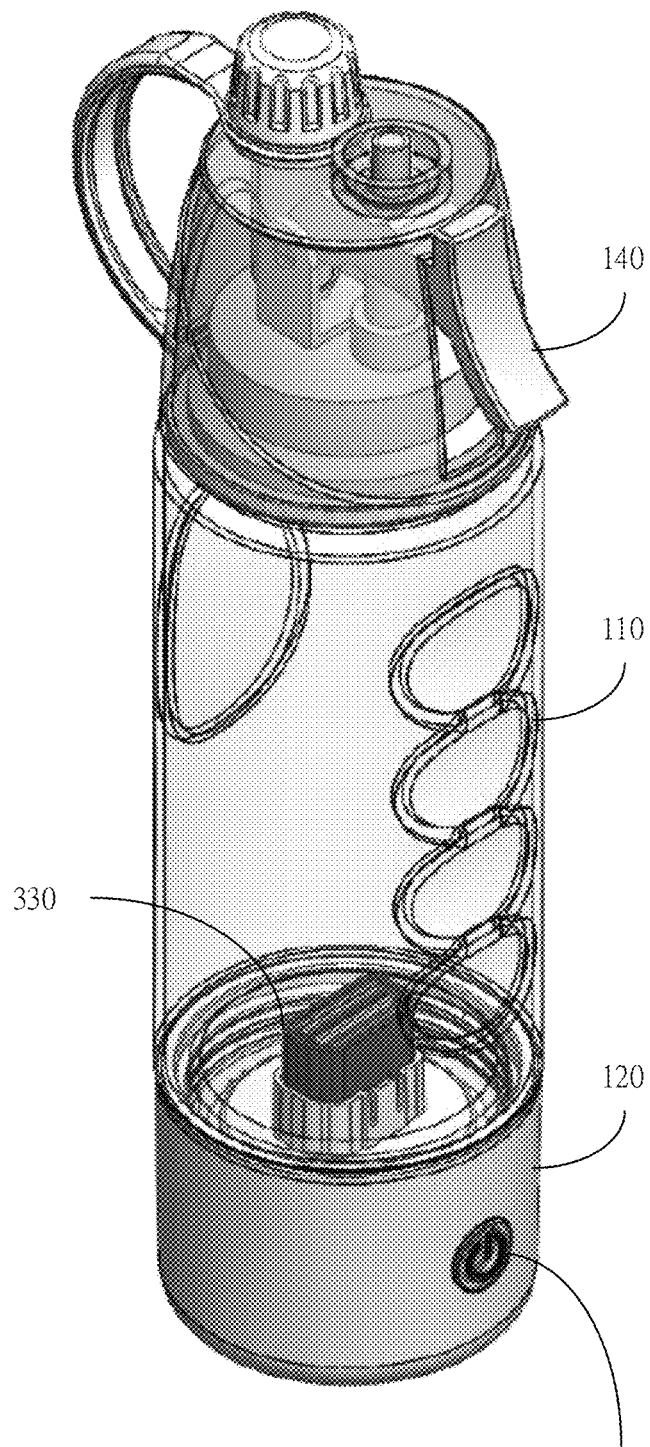
FIG. 3 is a perspective view of yet another embodiment of a water bottle 300 in accordance with the present application.

Please refer to FIG. 3, which is a perspective view of yet another embodiment of a water bottle 300 in accordance with the present application. The water bottle 300 may share the same water tank 110, the electric compartment 120, and the cap 140 with the water bottle 100 as shown in FIG. 1. However, the ozone generation assembly of the ozone generator 330 is different from the ozone generation assembly of the ozone generator 130. Thus, the ozone generation assemblies are designed to be interchangeable modules.

The ozone generation assembly of the ozone generator 330 contains electrode plates perpendicular to a horizontal plane. A covering part may be used to enclose the electrode plates with the assistance of a base part which is installed in the bottom opening in between the water tank 110 and the electric compartment 120. One or more supporting parts may be also enclosed by the top covering part to support the arrangement of the electrode plates and their associated circuits.

As mentioned above, there may be an elastic seal around the base part to prevent leakage from the water tank 110 to the electric compartment 120. There may be also seal rings attached to circuits supported by the one or more supporting parts. As a result, the water in the water tank 110 cannot enter the electric compartment 120 via the ozone generation assembly.

Figure 4:
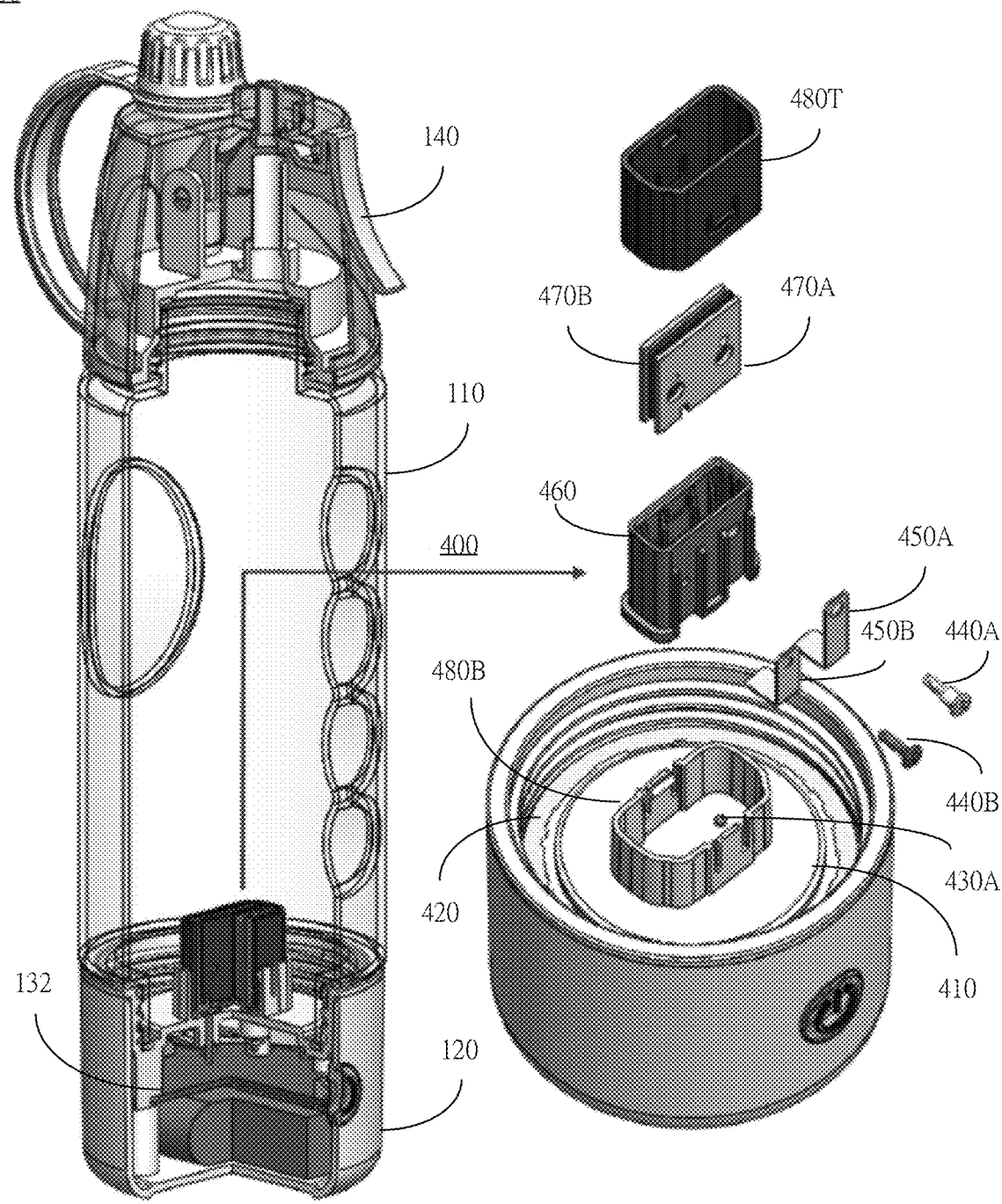
FIG. 4 is an exploded view of one embodiment of an ozone generation assembly 400 of the water bottle 300 as shown in FIG. 3.

Please refer to FIG. 4, which is an exploded view of one embodiment of an ozone generation assembly 400 of the water bottle 300 as shown in FIG. 3. Left hand side of FIG. 4 shows the water bottle 300 of FIG. 3. Right hand side of FIG. 4 shows the electric compartment 120 and an ozone generation assembly 400 of the ozone generator 330 of the water bottle 300. Comparing with the ozone generation assembly as shown in FIGS. 1 and 2, the ozone generation assembly 400 as shown in FIG. 4 has vertically arranged electrode plates which are perpendicular to a horizontal plane.

As shown in both sides of FIG. 4, there are threads on the inner surface of the electric compartment 120. The water tank 110 also has corresponding threads such that the water tank 110 can be combined with the electric compartment 120. As described above, the circuitry part 132 of the ozone generator 330 is arranged inside the electric compartment 120. A battery and a circuitry board of the ozone generator 330 may be included in the electric compartment 120 of the left-hand side of FIG. 4. The replaceable or rechargeable battery may be configured to supply electricity to the circuitry part 132 of the ozone generator 330.

The ozone generation assembly 400 includes a base part 410 to fit in the electric compartment 120. A second side of the base part 410 faces upward to the water tank 110. An opposite side of the base part 410 faces downward to the electric compartment 120. There may be an O-ring seal 420 resided in between the electric compartment 120 and the base part 410. The O-ring seal 420 is used to prevent the water in the water tank 110 leaking into the electric compartment 120.

The supporting part 460 would be vertically plugged into the hollow space in the middle of a bottom covering part 480B which is protruding out of a surface of the base part 410. Flexible fastens may be presented in the corresponding places of the supporting part 460 and the bottom covering part 480B so as the supporting part 460 can be secured to the bottom covering part 480B. Alternatively, flexible fastens may be presented in the corresponding places of the supporting part 460 and the top covering part 480T so as the supporting part 460 can be secured to the top covering part 480T.

The conductive circuits 450A and 450B are bent perpendicularly upward. They may be made of conductive metal or alloys. Top ends of the conductive circuits 450A and 450B may have a hole for the conductive screws 440A and 440B, respectively. The supporting part 460 may have two corresponding openings for the conductive screws 440A and 440B, too. The conductive screw 440A is slightly longer than the conductive screw 440B such that the conductive screw 440A may be arranged to contact the electrode plate 470B through an opening of the electrode plate 470A, the opening of the supporting part 460, and the hole of the conductive circuit 450A. Hence, the electrode plate 470B is electrically coupled to the electrical coupling head 430A through the conductive screw 440A and the conductive circuits 450A sequentially. Similarly, the conductive screw 44B may be arranged to contact the electrode 470A through an opening of the supporting part 460 and the hole of the conductive 470B. Hence, the electrode plate 470A is electrically coupled to the hidden electrical coupling head sequentially.

Alternatively, the electrical coupling head 430A and the hidden electrical coupling head in the middle of the base part 410 may be replaced by two holes or vias. Two conductive screws may be in contact with the conductive circuits 450A and 450B from the electric compartment 120 through the holes or vias, respectively. In this case, two O-ring seals may be applied to the conductive screws to seal potential leakages into the electric compartment 120. In other words, the electrical coupling heads are placed in vias of the base part 410 to connect the electrode plates 470A and 470B in the second side of the base part 410 with the circuitry part 132 of the ozone generator 330 in the first side of the base part 410.

The top covering part 480T is designed to enclose the electrode plates 470A and 470B, the supporting part 460, conductive circuits 450A and 450B, and conductive screws 440A and 440B. There may be fastens presented in the corresponding places of the two covering parts 480T and 480B such that the two covering parts 480T and 480B can be joined together to enclose the internal parts.

The water in the water tank 110 enters the ozone generation assembly 400 through the top covering part 480T. Reversely, the generated ozone solution is diffused through the top covering part 480T into the water tank 110.

In an embodiment, the user may take out of the modularized ozone generation assembly 400 entirely from the electric compartment 120. Alternatively, the user may take out the rest of the ozone generation assembly 400 except for the base part 410 and the bottom covering part 480B by releasing the fastens of the supporting part 460 or the top covering part 480T.

Figure 5:
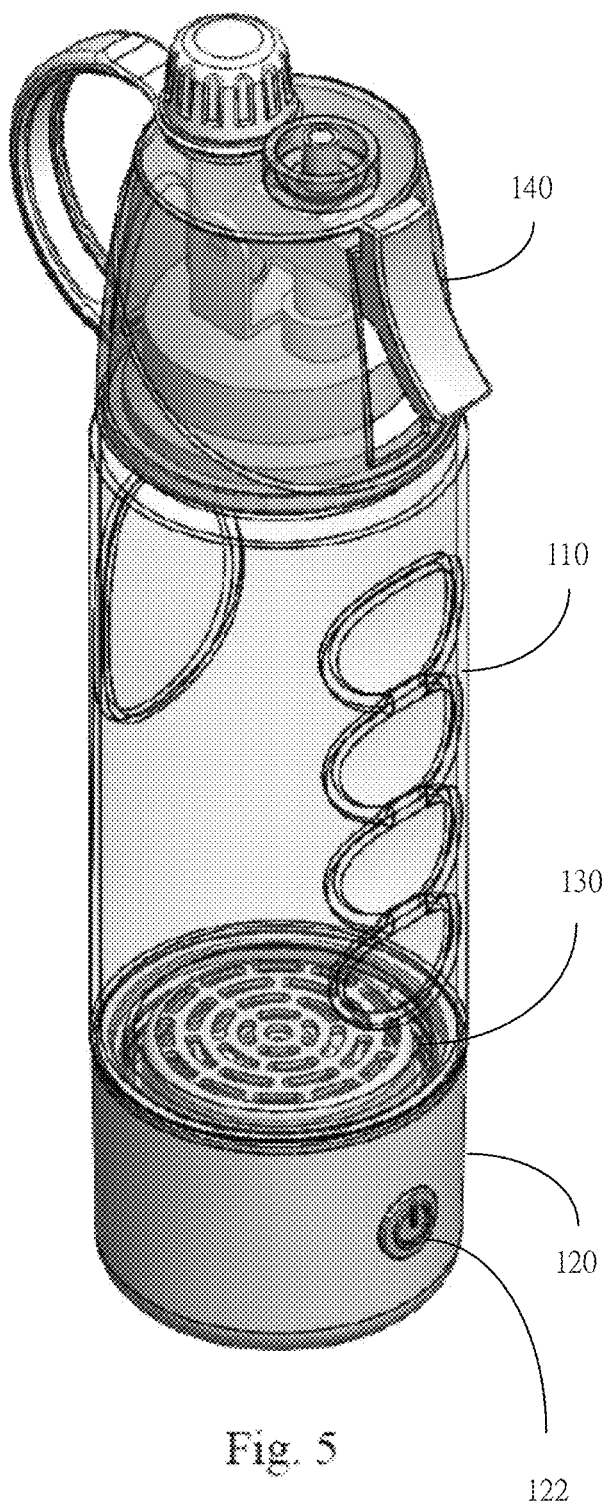
FIG. 5 is a perspective view of the water bottle 100 in accordance with an embodiment of the present application.
Figure 6:
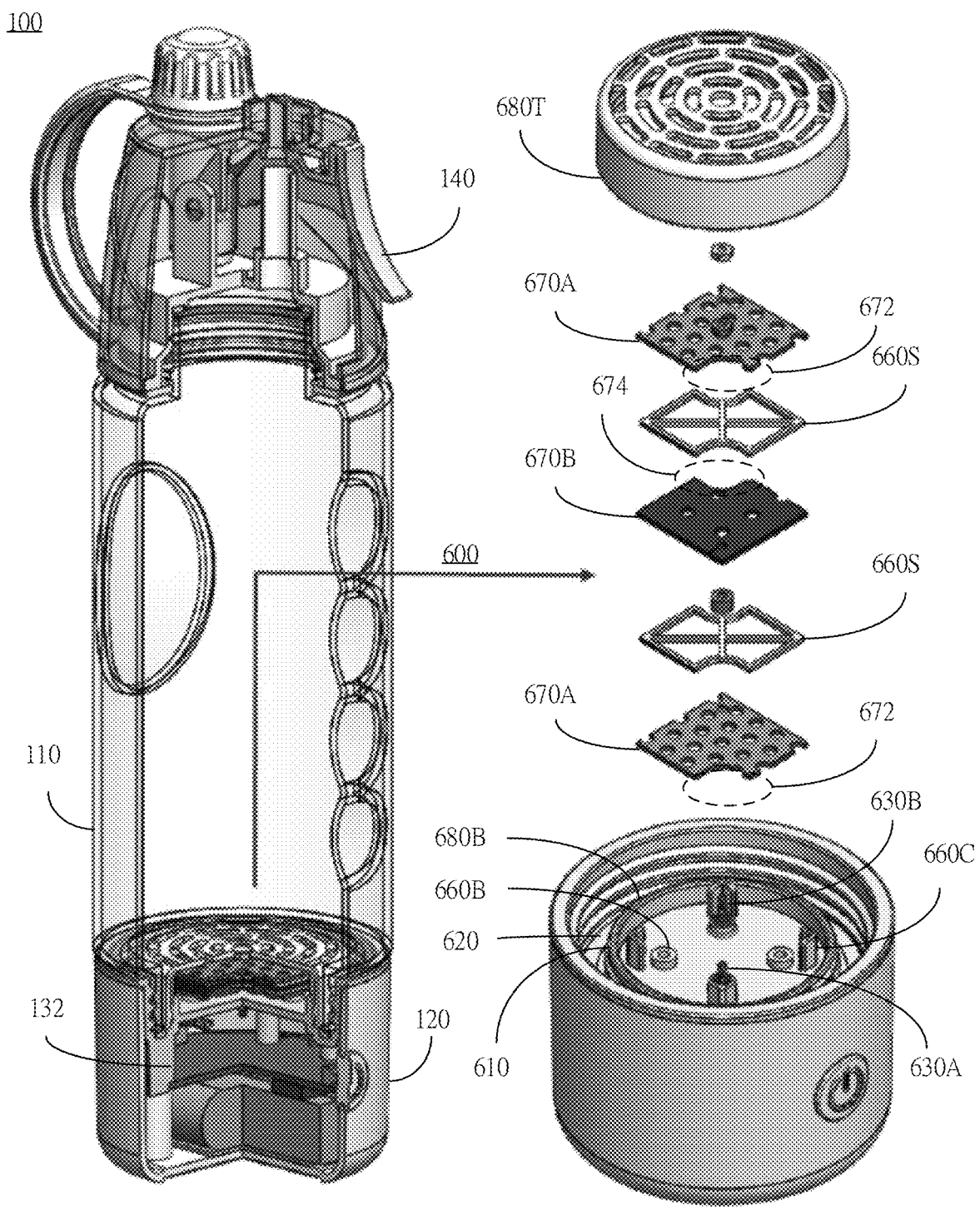
FIG. 6 is an exploded view of the water bottle 100.

Please refer to FIG. 5, which is a perspective view of the water bottle 100 in accordance with an embodiment of the present application. And please further refer to FIG. 6, which is an exploded view of the water bottle 100. Left hand side of FIG. 6 shows the water bottle 100 of FIGS. 1 and 3. Right hand side of FIG. 6 shows the electric compartment 120 and an ozone generation assembly 600 of the ozone generator 130 of the water bottle 100. Comparing with the ozone generation assembly 400 as shown in FIGS. 3 and 4, the ozone generation assembly 600 as shown in FIG. 6 has horizontally arranged electrode plates. Or in other words, the ozone generation assembly 600 uses a layered structure or a stack of electrode plates which are arranged in parallel to a horizontal plane.

As shown in both sides of FIG. 6, there are threads on the inner surface of the electric compartment 120. The water tank 110 also has corresponding threads such that the water tank 110 can be combined with the electric compartment 120. As described above, the circuitry part 132 of the ozone generator 130 is arranged inside the electric compartment 120. A battery and a circuitry board of the ozone generator 330 may be included in the electric compartment 120 of the left-hand side of FIG. 6. The replaceable or rechargeable battery may be configured to supply electricity to the circuitry part 132 of the ozone generator 130.

The ozone generation assembly 600 includes a base part 610 to fit in the electric compartment 120. There may be an O-ring seal 620 resided in between the electric compartment 120 and the base part 610. The O-ring seal 620 is used to prevent the water in the water tank 110 leaking into the electric compartment 120.

There are two covering parts 680T and 680B for enclosing the electrode plates 670A and 670B. The bottom covering part 680B may be arranged in the perimeter of the base part 610 as a wall structure. The hollow space inside the bottom covering part 680B is configured to contain base supporting parts 660B, corner supporting parts 660C, and dielectric supporting parts 660S, the electrode plates 670A and 670B, and two electrical coupling heads 630A and 630B. These two electrical coupling heads 630A and 630B may be protruding out of a surface of the base part 610 such that the two electrical coupling heads 630A and 630B would be in contact with the electrode plates 670A and 670B, respectively. Alternatively, the parts of the electrical coupling heads protruding out of the surface of the base part 410 may be considered as circuits for coupling to the electrode plates.

Four corner-supporting parts 660C are arranged on the surface of the base part 610 of the ozone generation assembly 600. Each of them is corresponding to a corner of the electrode plates 670A or 670B which are rectangular plates. The height of the supporting parts 660C may be as the same as the height of the bottom covering part 680B. The corner supporting parts 660C are designed to secure the positions of the electrode plates 670A and 670B by holding the corners of the electrode plates 670A and 670B.

A plurality of bottom supporting parts 660B are arranged on the surface of the base part 610 of the ozone generation assembly 600. They are used to support a bottom one of the electrode plates 670A and 670B. The height of the bottom supporting parts 660B may be lower than the height of the bottom covering part 680B. The height of the bottom supporting parts 660B may be lower than the height of the corner supporting parts 660C.

In order to be in contact with the bottom electrode plate 670A and the optional top electrode plate 670A, the electrical coupling head 630B may be longer than the other one of the electrical coupling heads, i.e., the electrical coupling head 630A. Similarly, the shorter electrical coupling heads 630A is configured to be in contact with the middle electrode plate 670B. There may be O-ring seals for these two electrical coupling heads 630A and 630B. The O-ring seals may be on top of the surface of the base part 610. Optionally, other O-ring seals may be beneath the base part 610. These seals are designed to prevent leakage from the ozone generation assembly 600 into the electric compartment 120.

In some embodiments, the two electrical coupling heads 630A and 630B may be screws. They may have screw threads. Thus, there may be nuts to secure the contacts between the electrical coupling heads 630A and 630B and the electrode plates 670A and 670B.

The electrode plate 670A is generally a rectangular plate or a square plate with a missing corner 672. The electric coupling head 630A would be passed through the missing corner 672 of the bottom electrode plate 670A. The missing corner 672 is to make room for the electric coupling head 630A.

Similarly, there is also a missing corner 674 of the electrode plate 670B. The electric coupling head 630B would be in place of the missing corner 674 of the middle electrode plate 670B. The missing corner 674 is to make room for the electric coupling head 630B. There is a hole in the diagonal corner of the missing corner 672 of the electrode plate 670A. The electrical coupling head 630B would be passed sequentially through the hole of the bottom electrode plate 670A and the missing corner 674 of the middle electrode plate 670B. A nut may be attached to the top end of the electrical coupling head 630B and the hole of the top electrode plate 670A. Another nut would be attached to the top end of the electrical coupling head 630A and a hole of the middle electrode plate 670B.

There may be a plurality of holes in the electrode plates 670A and 670B for increasing the surface areas. One of the electrode plates 670A and 670B is attached to a positive pole of the circuitry of the ozone generator 130. The other one of the electrode plates 670A and 670B is attached to a negative pole of the circuitry of the ozone generator 130. The present application does not limit which one of the electrode plates 670A and 670B is anode or cathode. In addition, the present application does not limit how many electrode plates are included in the ozone generation assembly 600.

There may be one or more dielectric supporting parts 660S in between the electrode plates 670A and 670B. They may be made of dielectric materials to isolate the nearby electrode plates 670A and 670B. Two missing diagonal corners of the supporting parts 660S are arranged to be corresponding to the missing corners 672 and 674.

The top covering part 680T is designed to enclose the electrode plates 670A and 670B, the base supporting parts 660B, the corner supporting parts 660C, and dielectric supporting parts 660S, and the electrical coupling heads 630A and 630B. There may be fastens presented in the corresponding places of the two covering parts 680T and 680B such that the two covering parts 680T and 680B can be joined together to enclose aforementioned internal parts. Holes or concentric openings may be arranged on the top covering part 680T.

The water in the water tank 110 enters the ozone generation assembly 600 through the top covering part 680T. Reversely, the generated ozone solution is diffused through the top covering part 680T into the water tank 110.

In an embodiment, the user may take out of the modularized ozone generation assembly 600 entirely. In one embodiment, the user may take out of the rest of the ozone generation assembly 600 except for the base part 610 and the bottom covering part 680S.

In one aspect of the present application, an ozone-based health protection water bottle is provided. As a new type of health protection portable water bottle, an ozone-based water bottle is not only capable of sterilization and disinfection, but also odor removal, quality improvement of water etc. featuring characteristics.

In one aspect combinable with the general implementation, the core technique of the ozone-based water bottle is to electrolyze water with TDS 30~1000 ppm (equivalent to EC, electrical conductivity, 60~2000 us/cm) by tailored made titanium anode and cathode plates. It takes low voltage direct current 6V~36V to highly efficiently electrolyze water which can generate ozone dissolved in the water in a short time. An advantage of this design is free of hazardous substances generated. Utilizing it in daily life contributes to achieve optimal personal health protections. The advantages include gargling or spraying on trauma wounds to disinfect.

In another aspect combinable with the general implementation, an ozone generation module structure applicable to water with TDS 30~1000 ppm (equivalent to EC, electrical conductivity, 60~2000 us/cm) is protected by adopting the modules as shown in FIGS. 3 and 4. The designs are suitable for production and are replaceable in the terminal products by users. Applicable variants are in the scope of the ozone-based health protection portable water bottle.

In another aspect combinable with the general implementation, an ozone generation module structure applicable to water with TDS 30~1000 ppm (equivalent to EC, electrical conductivity, 60~2000 us/cm) is protected by adopting the stacks as shown in FIGS. 5 and 6. Applicable variants are in the scope of the ozone-based health protection portable water bottle.

Ozone-Based Water Irrigator (Water Flosser/Water Pik)

Figures 7A, 7B, 7C:
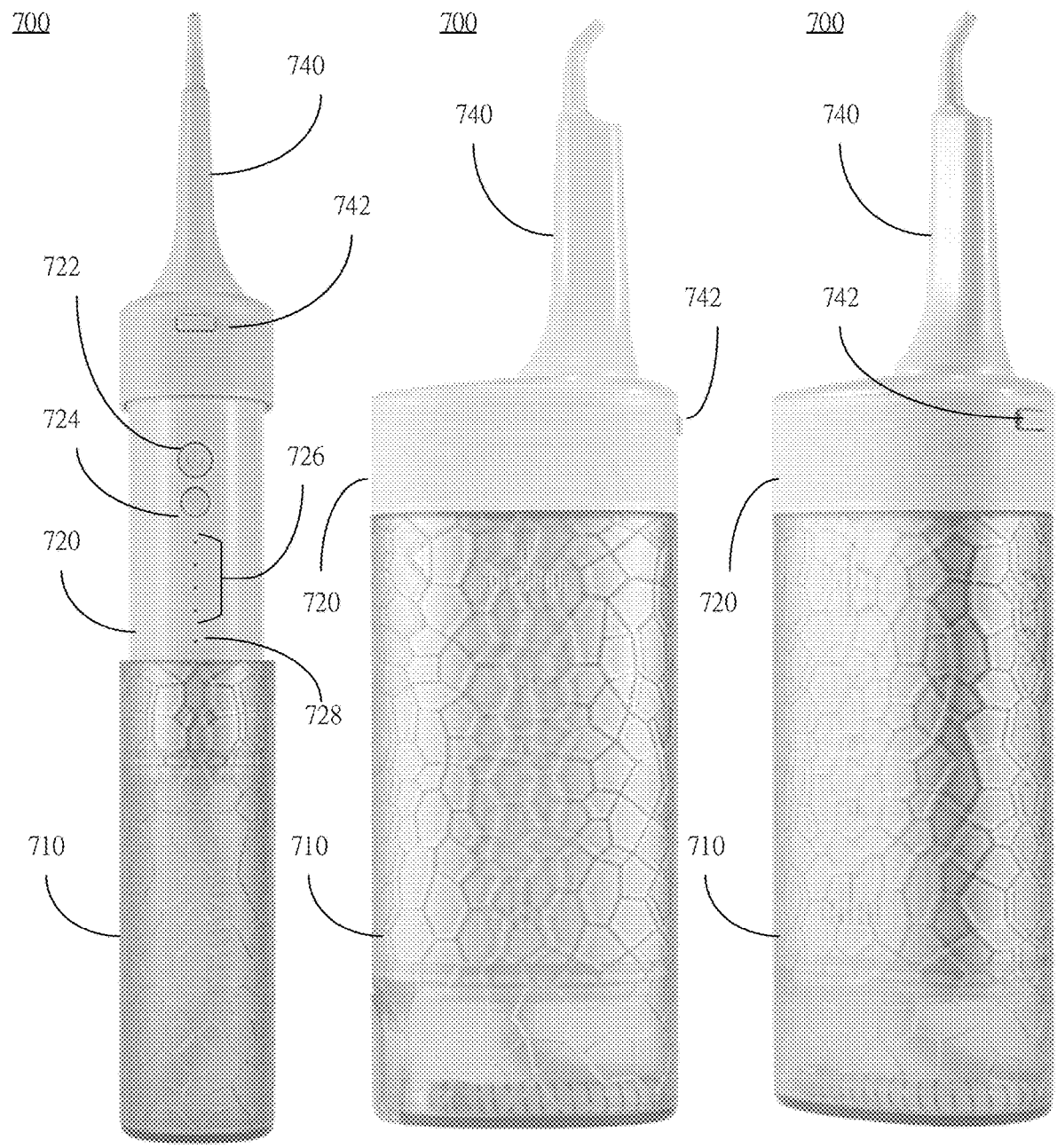
FIG. 7A illustrates a water irrigator 700 in a use mode in accordance with an embodiment of the present application.
FIG. 7B illustrates a side view of the water irrigator 700 in a close mode.
FIG. 7C illustrates a perspective view of the water irrigator 700 in the close mode.

Please refer to FIG. 7A, which illustrates a water irrigator 700 in a use mode in accordance with an embodiment of the present application. FIGS. 7B and 7C illustrates a side view and a perspective view of the water irrigator 700 in a close mode. The water irrigator 700 is also called water pik or water flosser. These three terms may be interchangeable in the present application. The water irrigator 700 includes a water tank 710, an electric compartment 720, an ozone generator hidden inside, and a nozzle 740.

In one embodiment, the water tank 710 may be detachable from the rest of the water irrigator 700. The user can fill water into the water tank 710 and attach the filled water tank 710 to the underneath of the electric compartment 720.

Alternatively, in another embodiment, there may be a water tank cap or filling port 710 underneath the water tank 710 or in the lower part of the water tank 710. The user may reverse the water irrigator 700 upside down and open the water tank cap 712. After that, the water tank 710 can be filled with water and the user closes the water tank cap 712 to keep the water inside the water tank 710.

For the convenience of storage and carriage, in the close mode as shown in FIGS. 7B and 7C, the volume of the water irrigator 700 may be decreased by pushing the water tank 710 toward the electric compartment 720 so as the water tank 710 covers the panel of the electric compartment 720. In other words, the electric compartment 720 is pushed into the water tank 710. The electric compartment 720 is movable into the water tank 710. As a result, the water irrigator 700 is shortened. In this case, an O-ring seal may be available on the inner surface of the lower part of the electric compartment 720 or on the inner surface of the higher part of the water tank 710 to keep the water from leakage.

The nozzle 740 may be detachable and replaceable. A nozzle assembling button 742 may be presented and configured to release a fasten mechanism of the nozzle 740. Once the nozzle assembling button 742 is pressed, the fasten mechanism inside the electric compartment 720 is released so as the nozzle 740 can be detached from the electric compartment 720. New or refreshed nozzle 740 can be plugged into the electric compartment 720.

A power switch or button 722 may be presented on a control panel of the electric compartment 720. Also on the control panel, there are optionally a switching mode button 724, several mode indicator lights 726, and a battery indicator light or charging indicator light 728. The user may use the switching mode button 724 to switch to one of the water jet modes: soft, standard, strong, and pulse. One of the mode indicator lights 726 may be turned on to indicate its corresponding water jet mode being switched to. If there is only one mode indicator light 726, it can show the mode by changing the light color or the frequency of flashing light. The battery indicator light or the charging 728 may be also turned on when the battery is discharging or charging.

The ozone generator has a water inlet facing the water tank 710 and a water outlet facing the electric compartment 720. Once the user turns the water irrigator 700 on, the ozone generator begins to generate ozone which would be dissolved into water. A pump connected with the ozone generator 730 sucks the ozone solution from the water outlet of the ozone generation assembly and pushes the water out of the nozzle 740. As described, the water inlet may be connected with a pipe having a weighted head which is always dropped to the lowest place of the water tank 710 to retrieve water. Although the water tanks 710 as shown in FIGS. 7A~7C are not transparent enough, the pipes inside the water tanks 710 can be seen barely.

Figure 8:
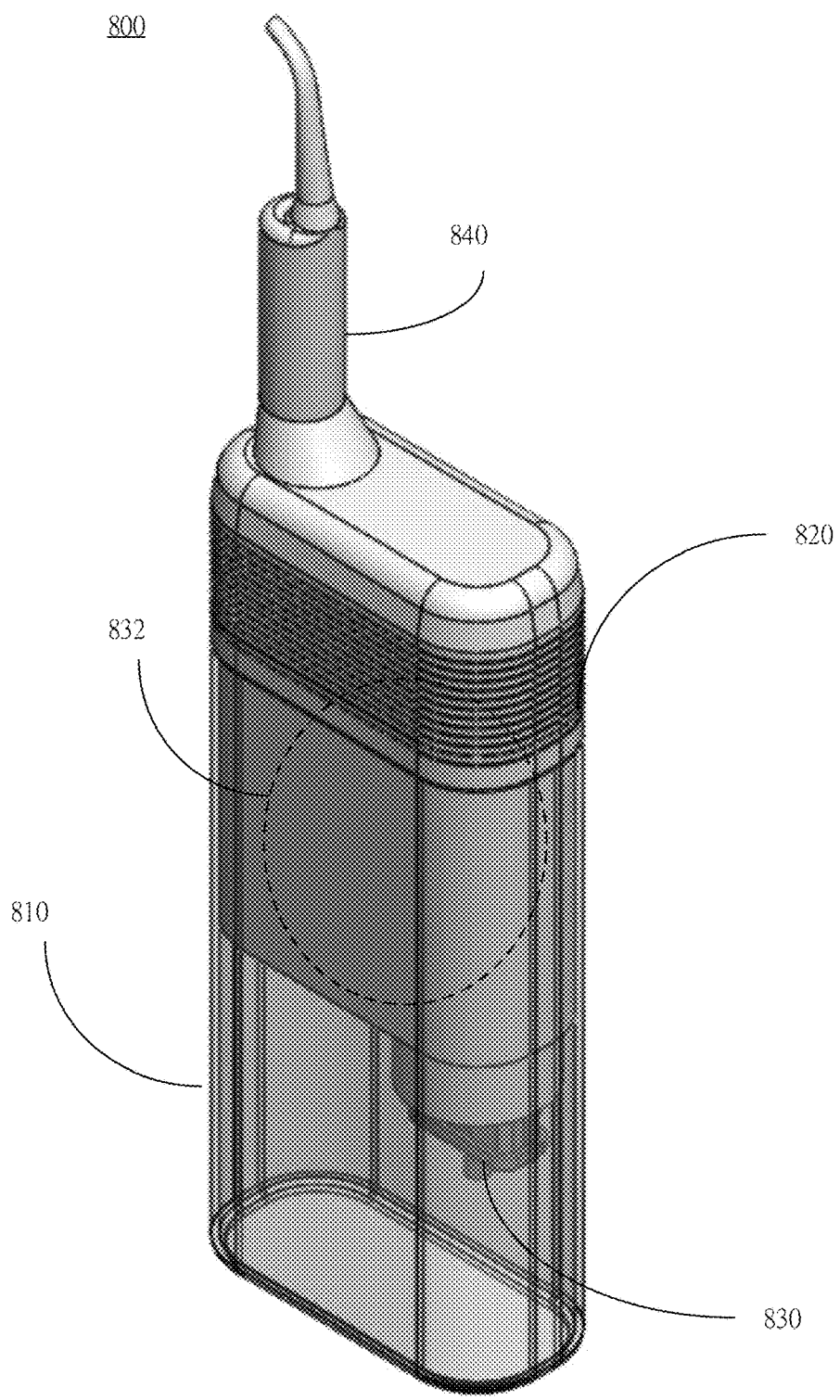
FIG. 8 is a diagram depicts a water irrigator 700 in accordance with an embodiment of the present application.

Please refer to FIG. 8, which is a diagram depicts a water irrigator 700 in accordance with an embodiment of the present application. Like the water irrigator 700 as shown in FIG. 7A, the water irrigator 800 comprises a water tank 810, an electric compartment 820, an ozone generator 830 installed in an opening in between the water tank 810 and the electric compartment 820, and a nozzle 840 on top of the electric compartment 820. A pump, a battery, a circuitry part 832 of the ozone generator 830, and a control circuit of the water irrigator 800 are arranged in the electric compartment 820. The electric compartment 820 may be waterproof. In one embodiment, the protection rating of the electric compartment 820 according to IEC 60529 may be compliant to IPx4 or more demanding standards.

Figure 9:
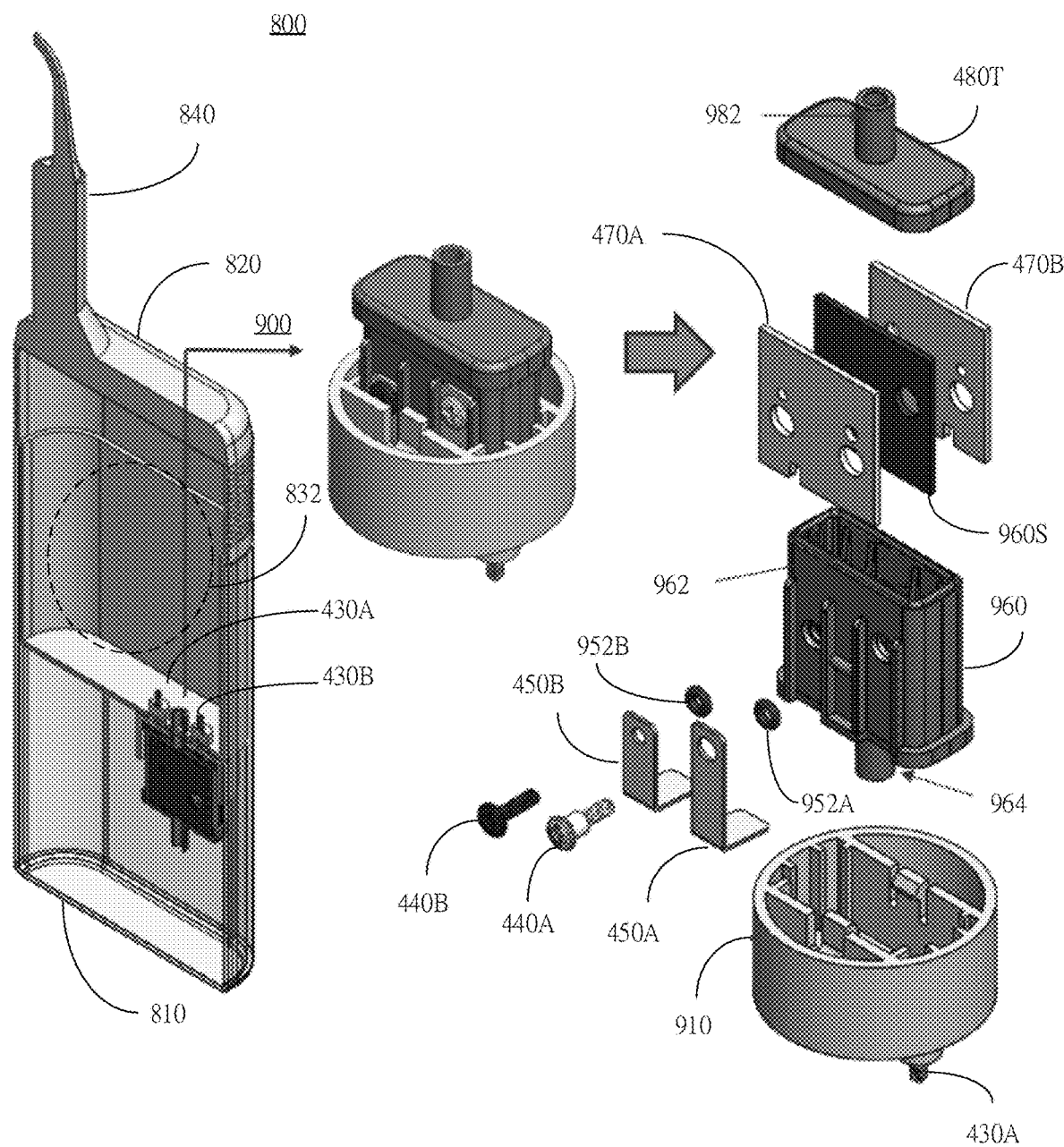
FIG. 9 is an exploded view and an integrated view of an ozone generation assembly 900 of the water irrigator 800 as shown in FIG. 8.

Please refer to FIG. 9, which is an exploded view and an integrated view of an ozone generation assembly 900 of the water irrigator 800 as shown in FIG. 8. Left hand side of FIG. 9 shows a sectional view of the water irrigator 800 of FIG. 7A. Right hand side of FIG. 9 shows the exploded ozone generation assembly 900 of the ozone generator 830 of the water irrigator 800. A changeable module shows the ozone generation assembly 900 is presented in the middle of FIG. 9. The ozone generation assembly 900 as shown in FIG. 9 has vertically arranged electrode plates which are arranged in perpendicular to a horizontal plane.

Like wisely, the ozone generation assembly 900 is a variant of the ozone generation assembly 400 as shown in FIG. 4. If the numerals of components as shown in FIG. 9 are as the same as the numerals of components as shown in FIG. 4, the components may be similar or identical. Unlike the ozone generation assembly 400, the ozone generation assembly 900 is installed upside down in the water irrigator 800.

As described above, the circuitry part 832 of the ozone generator 830 is arranged inside the electric compartment 820. A battery and a circuitry board of the ozone generator 730 may be included in the electric compartment 720 of the left-hand side of FIG. 9. The replaceable or rechargeable battery may be configured to supply electricity to the circuitry part 832 of the ozone generator 730.

The ozone generation assembly 900 includes a base part 910 to fit in the electric compartment 820. There may be an O-ring seal resided in between the electric compartment 820 and the base part 910. The O-ring seal is used to prevent the water in the water tank 810 leaking into the electric compartment 820.

There is a top covering part 980T for covering the electrode plates 470A and 470B. The omitted bottom covering part is combined with the base part 910. A water inlet 982 facing the water tank 710 may be arranged in the middle of the top covering part 980T. An end of a pipe may be connected to the water inlet 982 The other end of the pipe may be a weighted head which is always dropped to the lowest place of the water tank 810 to retrieve water.

The base part 910 may have a hollow compartment in the middle to enclose the electrode plates 470A and 470B and supporting parts 960 and 960S. A wall structure may be also included in the perimeter of the base part 910. An opening for accommodating the water outlet 964 of the support part 960 is available in the middle of the base part 910. A dielectric supporting part 960S may be made of dielectric to isolate the electrode plates 470A and 470B.

The supporting part 960 is configured to be attached to the middle of the base part 910 by a fasten mechanism. To combine with the top covering part 480T, there may exists a hot melt wire or glue 962 on the top edge of the supporting part 960. Person having ordinary skill in the art can understand that the hot melt wire or glue 962 may be replaced by other kinds of adhesive. Preferably, the applicable adhesive may be water-resistant. Alternatively, another fasten mechanism may be used also presented in the supporting part 960 and the covering part 480T so as the user can release the fasten mechanism to separate the covering part 480T from the supporting part 960.

There are two electrical coupling heads 430A and 430B supposed to be in contact with the two conductive circuits 450A and 450B with their first ends. Their second ends protrude beneath the base part 910. The conductive circuits 450A and 450B may be made of conductive metal or alloys. As shown in the left-hand side of FIG. 9, second ends of the electrical coupling heads 430A and 430B protrude out of the first side of the base part 910 of the ozone generation assembly 900. The second ends of the electrical coupling heads 430A and 430B are supposed to be coupling to the circuitry part 832 of the ozone generator 830.

The conductive circuits 450A and 450B bent upward. Their top ends have holes for accommodating the conductive screws 440A and 440B, respectively. One of the screws 440A and 440B may be longer than the other one of the screws 440A and 440B to be in contact with the electrode plate 470B. The shorter one of the screws 440A and 440B is configured to be in contact with the electrode plate 470A. There may exists two gaskets 952A and 952B to protect the supporting part 960.

Although there is no dedicated power switch of the ozone generator 830 appeared on the panel of the water irrigator 800 as shown in FIG. 8, an optional power switch and/or an optional power indicator light of the ozone generator 830 may be available on the control panel of the water irrigator 800. In the embodiment as shown in FIG. 8, a power switch 722 may be configured to turn on or turn off the ozone generator 830 and the water jettison function of the water irrigator 800 at the same time.

Figure 10:
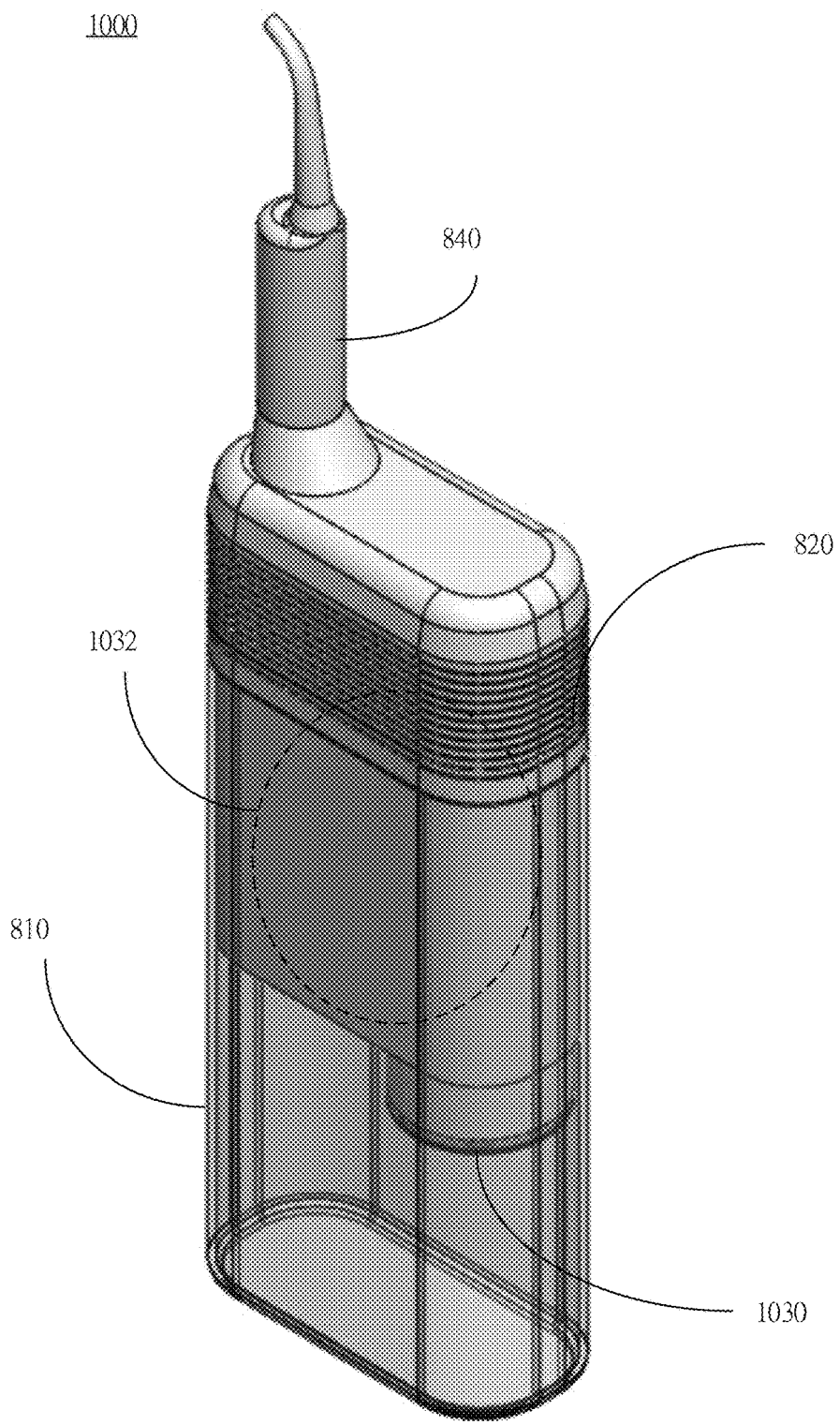
FIG. 10 is a diagram depicts a water irrigator 1000 in accordance with another embodiment of the present application.

Please refer to FIG. 10, which is a diagram depicts a water irrigator 1000 in accordance with another embodiment of the present application. Like the water irrigator 800 as shown in FIG. 8, the water irrigator 1000 comprises a water tank 810, an electric compartment 820, an ozone generator 1030 installed in an opening in between the water tank 810 and the electric compartment 820, and a nozzle 840 on top of the electric compartment 820. A pump, a battery, a circuitry of the ozone generator 1030, and a control circuit of the water irrigator 1000 are arranged in the electric compartment 820. The electric compartment 820 may be waterproof. In one embodiment, the protection rating of the electric compartment 820 according to IEC 60529 may be compliant to IPx4 or more demanding standards.

Figure 11:
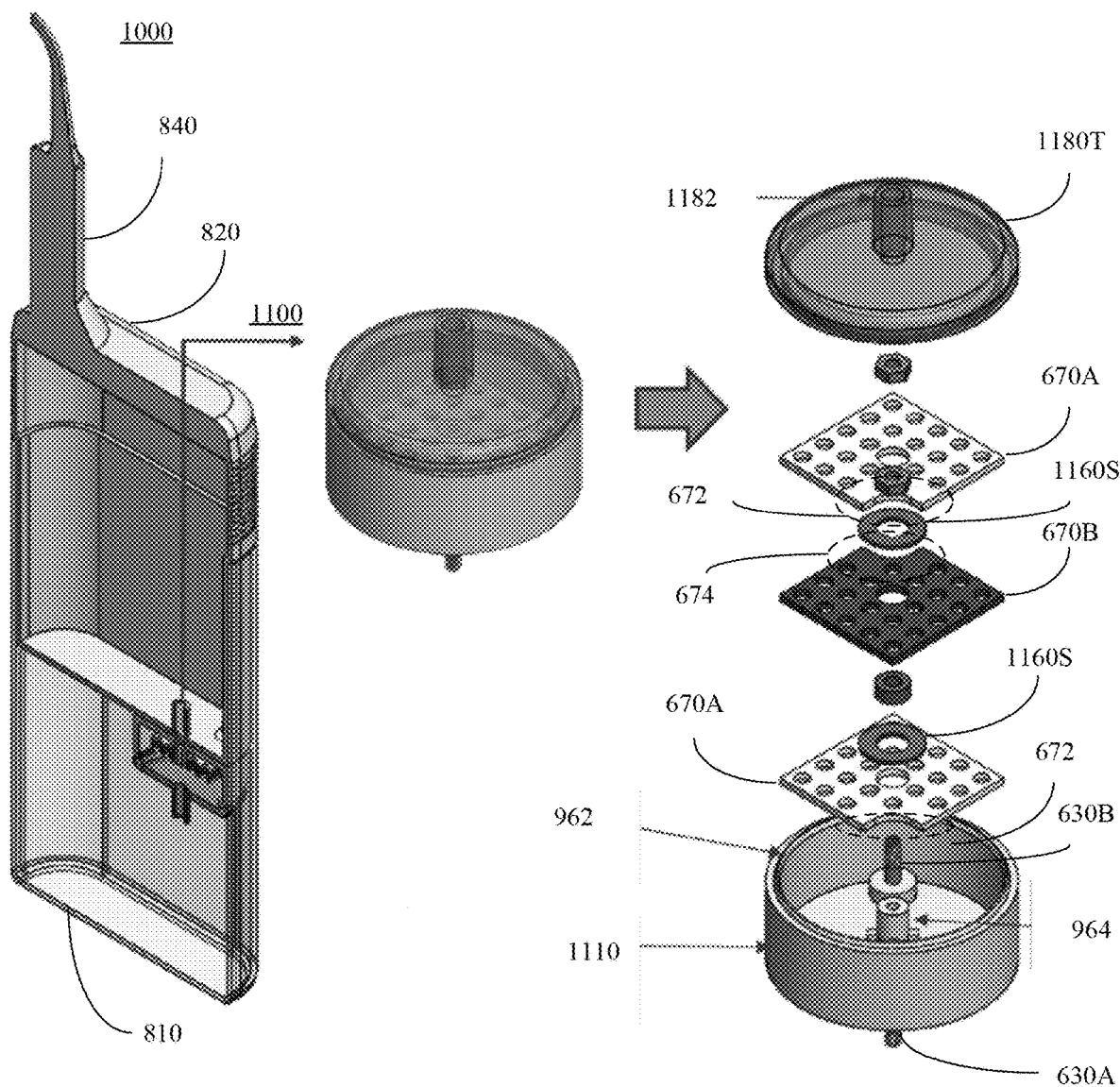
FIG. 11 is an exploded view and an integrated view of an ozone generation assembly 1100 of the water irrigator 1000 as shown in FIG. 10.

Please refer to FIG. 11, which is an exploded view and an integrated view of an ozone generation assembly 1100 of the water irrigator 1000 as shown in FIG. 10. Left hand side of FIG. 11 shows a sectional view of the water irrigator 1000 of FIG. 10. Right hand side of FIG. 11 shows the ozone generation assembly 1100 of the ozone generator 1030 of the water irrigator 1000. A changeable module shows the ozone generation assembly 1100 is presented in the middle of FIG. 10. The ozone generation assembly 1100 as shown in FIG. 11 has horizontally arranged electrode plates which are arranged in parallel to a horizontal plane.

Like wisely, the ozone generation assembly 1100 is a variant of the ozone generation assembly 600 as shown in FIG. 6. If the numerals of components as shown in FIG. 11 are as the same as the numerals of components as shown in FIG. 6, the components may be similar or identical. Unlike the ozone generation assembly 600, the ozone generation assembly 1100 is installed upside down in the water irrigator 1000.

As described above, the circuitry part 1032 of the ozone generator 1030 is arranged inside the electric compartment 820. A battery and a circuitry board of the ozone generator 1030 may be included in the electric compartment 820 of the left-hand side of FIG. 11. The replaceable or rechargeable battery may be configured to supply electricity to the circuitry part 1032 of the ozone generator 1030.

The ozone generation assembly 1100 includes a base part 1110 to fit in the electric compartment 820. There may be an O-ring seal resided in between the electric compartment 820 and the base part 1110. The O-ring seal is used to prevent the water in the water tank 810 leaking into the electric compartment 820.

There is a covering part 1180T for covering the electrode plates 670A and 670B. As shown in FIG. 11, the covering part 1180T may be made of transparent materials such as plastics. The omitted bottom covering part is combined with the base part 1110. A water inlet 1182 facing the water tank 710 may be arranged in the middle of the covering part 1180T. A pipe may be connected to the water inlet 1182. The other end of the pipe may be a weighted head which is always dropped to the lowest place of the water tank 810 to retrieve water.

The base part 1110 may have a circular wall structure in the perimeter to form a hollow space in the middle to enclose the electrode plates 670A and 670B and the dielectric supporting parts 1160S. A water outlet 964 is available in the middle of both sides of the base part 1110. The water outlet 964 protruding the surface of the second side of the base part 1110 to align with the centers of the electrode plates 670A and 670B, the centers of the dielectric supporting parts 1160S, and the water inlet 1182 of the top covering part 1180T. The water outlet 964 also serves the role of a supporting part.

The dielectric supporting parts 1160S may be made of dielectric to isolate the electrode plates 470A and 470B. The dielectric supporting part 1160S has an opening in the middle for aligning the underlying water outlet 964 and the top water inlet 1182 so as the water can flow from the water inlet 1182 to the water outlet 964 through the middle opening of the supporting parts 1160S. The shape of the supporting part 1160S may not be limited as long as they do not collide with the electric coupling heads 630A and 630B.

In order to combine with the covering part 1180T, there may exists a hot melt wire or glue 962 on the top edge of the circular wall structure of the base part 1110 and/or on the bottom edge of the perimeter of the top covering part 1180T. Person having ordinary skill in the art can understand that the hot melt wire or glue 962 may be replaced by other kinds of adhesive. Preferably, the applicable adhesive may be water-resistant. Alternatively, another fasten mechanism may be used also presented in the base part 1110 and the covering part 1180T so as the user can release the fasten mechanism to separate the covering part 1180T from the base part 1110.

The electric circuitries between the electric coupling heads 630A and 630B and the electrode plates 670A and 670B are already described in the embodiment as shown in FIG. 6. There may exists nuts to fix the electrode plates 670A and 670B with the electric coupling heads 630A and 630B.

In an embodiment, the user may take out of the modularized ozone generation assembly 1100 entirely. Thus, the ozone generation assembly 1110 can be clean easily.

Differentiating from traditional oral irrigator (water flosser/pik), a personal oral care irrigator (water flosser/pik) is innovative globally based on ozone. Characteristics of this product include oral care, sterilization, disinfect, odor removal, and etc.

In one aspect combinable with the general implementation, the core technique of the ozone-based oral irrigator is to electrolyze water with TDS 30~1000 ppm (equivalent to EC, electrical conductivity, 60~2000 us/cm) by tailored made titanium anode and cathode plates. It takes low voltage direct current 6V~36V to highly efficiently electrolyze water which can generate ozone dissolved in the water in a short time. An advantage of this design is free of hazardous substances generated. Utilizing it in daily life contributes to achieve optimal personal health protections. The advantages include gargling or spraying on trauma wounds to disinfect.

In one aspect combinable with the general implementation, an ozone generation module structure applicable to water with TDS 30~1000 ppm (equivalent to EC, electrical conductivity, 60~2000 us/cm) is protected by adopting the modules as shown in FIGS. 8 and 9. The designs are suitable for production and replaceable in the terminal products by users. Applicable variants are in the scope of the personal health oral care irrigator (water flosser/pik).

In one aspect combinable with the general implementation, an ozone generation module structure applicable to water with TDS 30~1000 ppm (equivalent to EC, electrical conductivity, 60~2000 us/cm) is protected by adopting the stacks as shown in FIGS. 10 and 11. Applicable variants are in the scope of the ozone-based personal health protection portable irrigator. Ozone based toothbrush.

Figures 12, 13:
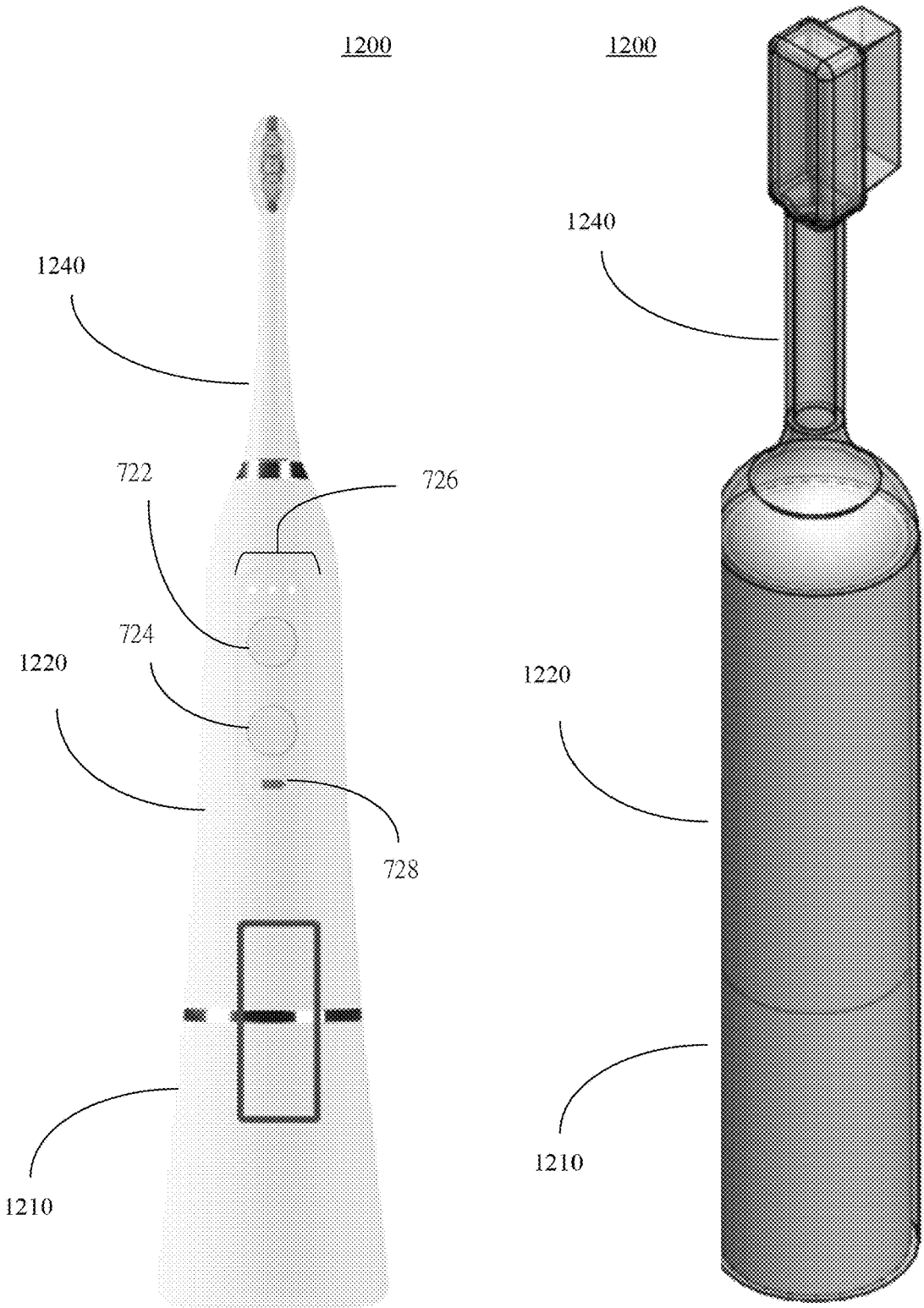
FIGS. 12 and 13 depict an ozone-based toothbrush 1200 in accordance with an embodiment of the present application.

Please refer to FIGS. 12 and 13, which depict an ozone-based toothbrush 1200 in accordance with an embodiment of the present application. The toothbrush 1200 comprises a water tank 1210, an electric compartment 1220, an ozone generator hidden inside the ozone-based toothbrush 1200, and a detachable and changeable toothbrush part 1240. Once the ozone-based toothbrush 1200 is turned on, the ozone solution generated by the ozone generator may be flowed out from the brush of the toothbrush part 1240 to sterilize and disinfect the brush as well as user's teeth and mouth.

A control panel similar to the control panel as shown in FIG. 7A may be available on the surface of the electric compartment 1220. The control panel may comprise a toothbrush assembling button, a power switch 722, several mode indicator lights 726, and a battery/charging indicator light 728. The ozone-based toothbrush 1200 may include a vibration function of the toothbrush part 1240. A vibration mode function button 724 may be presented on the control panel of the compartment 1220 for selecting one of vibration modes. One of the mode indicator lights 726 may be turned on to indicate its corresponding vibration mode being switched to. A switch for turn on/off the ozone solution flow may be available on the control panel.

Like the water irrigator 700, the water tank 1210 may be detachable from the rest of the toothbrush 1200. The user can fill water into the water tank 1210 and attach the filled water tank 1210 to the underneath of the electric compartment 1220.

Alternatively, in another embodiment, there may be a water tank cap or a filling port underneath the water tank 1210 or in the lower part of the water tank 1210. The user may reverse the ozone-based toothbrush 1200 upside down and open the water tank cap. After that, the water tank 1210 can be filled with water and the user closes the water tank cap to keep the water inside the water tank 1210.

For the convenience of storage and carriage, the volume of the toothbrush 1200 may be decreased by pushing the water tank 1210 toward the electric compartment 1220 so as the water tank 1210 covers the control panel of the electric compartment 1220. In other words, the electric compartment 1220 is pushed into the water tank 1210. As a result, the toothbrush 1200 is shortened. In this case, an O-ring seal may be available on the inner surface of the lower part of the electric compartment 1220 to keep the water.

The toothbrush part 1240 may be detachable and replaceable. A toothbrush assembling button may be presented and configured to release a fasten mechanism of the toothbrush part 1240. Once the toothbrush assembling button is pressed. The fasten mechanism inside the electric compartment 1220 is released so as the toothbrush part 1240 can be detached from the electric compartment 1220. New or refreshed toothbrush part 1240 can be plugged into the electric compartment 1220.

The ozone generation assembly installed inside the toothbrush 1200 has a water inlet facing the water tank 1210 and a water outlet facing the electric compartment 1220. Once the user turns the toothbrush 1200 on, the ozone generator begins to generate ozone which would be dissolved into water. A pump connected with the ozone generation assembly sucks the ozone solution from the water outlet and pushes the water out of the toothbrush part 1240. As described, the water inlet may be connected with a pipe having a weighted head which is always dropped to the lowest place of the water tank 1210 to retrieve water.

Figure 14:
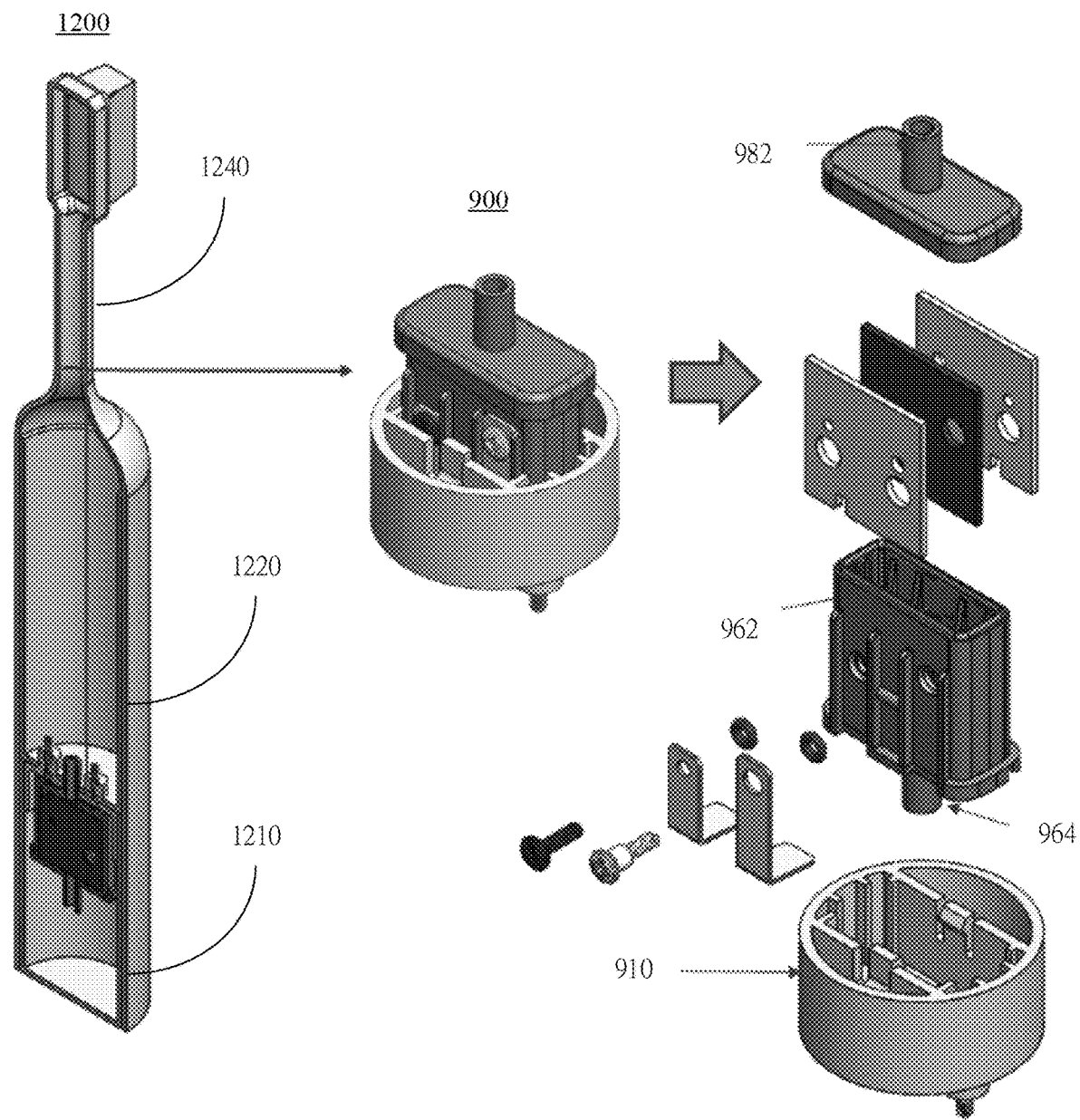
FIG. 14 is a sectional view depicts a toothbrush 1200 in accordance with an embodiment of the present application.

Please refer to FIG. 14, which is a sectional view depicts a toothbrush 1200 in accordance with an embodiment of the present application.

Like the toothbrush 1200 as shown in FIGS. 12 and 13, the toothbrush 1200 comprises a water tank 1210, an electric compartment 1220, an ozone generator installed in an opening in between the water tank 1210 and the electric compartment 1220. A toothbrush part 1240 is on top of the electric compartment 1220. A pump, a battery, and a circuitry of the ozone generator may be arranged in the electric compartment 1220. A vibration generator and a control circuit of the toothbrush 1200 may be also arranged inside the electric compartment 1220. The electric compartment 1220 may be waterproof. In one embodiment, the protection rating of the electric compartment 1220 according to IEC 60529 may be compliant to IPx4 or more demanding standards.

Aforementioned module of the ozone generation assembly 900 is presented in the middle of FIG. 14. Right hand side of FIG. 14 shows an exploded view of the ozone generation assembly 900. The ozone generation assembly 900 installed in the opening in between the water tank 1210 and the electric compartment 1220.

Since the ozone generation assembly 900 as shown in FIG. 14 is already discussed and disclosed in the previous paragraphs, please refer to these paragraphs for the ozone assembly 900. This shows the modularization effect of the ozone generation assembly.

Figure 15:
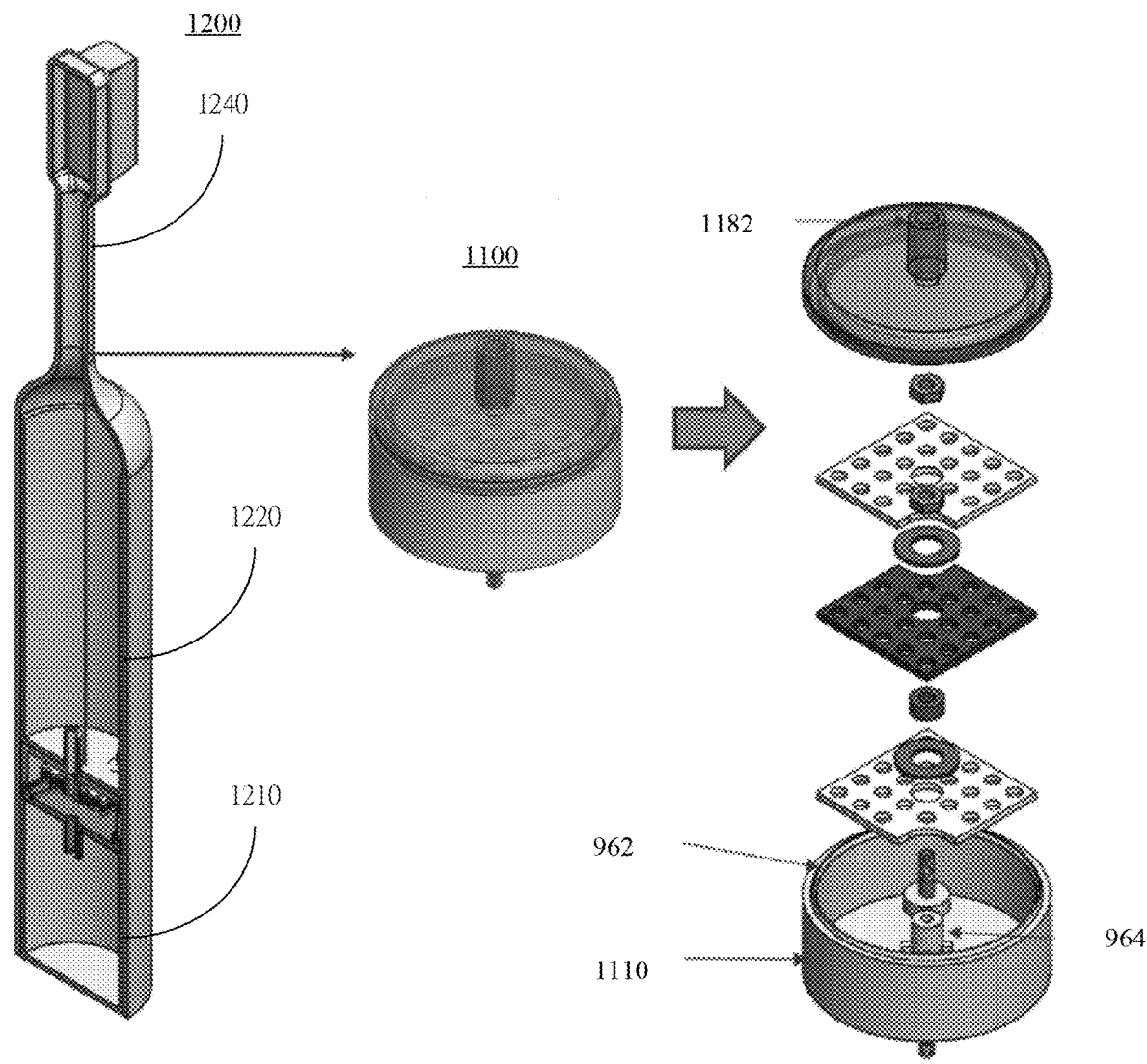
FIG. 15 is a sectional view of the ozone-based toothbrush 1200 in accordance with another embodiment of the present application.

Please refer to FIG. 15, which is a sectional view of the ozone-based toothbrush 1200 in accordance with another embodiment of the present application. Alternatively, the toothbrush 1200 as shown in FIG. 15 may use the ozone generation assembly 1100 as shown in FIG. 11 instead of the ozone generation assembly 900 as shown in FIG. 9.

Since the ozone generation assembly 1100 as shown in FIG. 15 is already discussed and disclosed in the previous paragraphs, please refer to these paragraphs for the ozone assembly 1100. This shows the modularization effect of the ozone generation assembly.

In one embodiment, the ozone generation assemblies 900 and 1100 are interchangeable because both have a water inlet and a water outlet, respectively. Therefore, the water pumped out of the water outlet can be transported to the toothbrush part 1240. This common design proves the modularization of the ozone generation assembly benefits. Consumers can buy modules of either of the ozone generation assemblies 900 and 1100 and install it into any one of the ozone-based devices and appliances without any difficulties. This modularization and standardization would save cost for the consumers who buy several kinds of ozone-based devices and appliances.

Differentiating from traditional electric toothbrush, a personal oral care electric toothbrush is innovative globally based on ozone. Featuring characteristics of this product include oral care, sterilization, disinfect, odor removal, and etc. See FIGS. 12, 13.

In one aspect combinable with the general implementation, the core technique of the ozone-based toothbrush is to electrolyze water with TDS 30~1000 ppm (equivalent to EC, electrical conductivity, 60~2000 us/cm) by tailored made titanium anode and cathode plates. It takes low voltage direct current 6V~36V to highly efficiently electrolyze water which can generate ozone dissolved in the water in a short time. An advantage of this design is free of hazardous substances generated. Utilizing it in daily life contributes to achieve optimal personal health protections. The advantages include gargling or spraying on trauma wounds to disinfect.

In one aspect combinable with the general implementation, an ozone generation module structure applicable to water with TDS 30~1000 ppm is protected by adopting the module as shown in FIG. 14. The design is suitable for production and replaceable in the terminal products by users. Applicable variants are in the scope of the personal health oral care electric toothbrush.

In one aspect combinable with the general implementation, as shown in FIG. 15, an ozone generation mechanism applicable to water with TDS 30~1000 ppm is protected by adopting the stacks. Applicable variants are in the scope of the personal health oral care electric toothbrush.

Ozone-Based Humidifier

Figure 16:
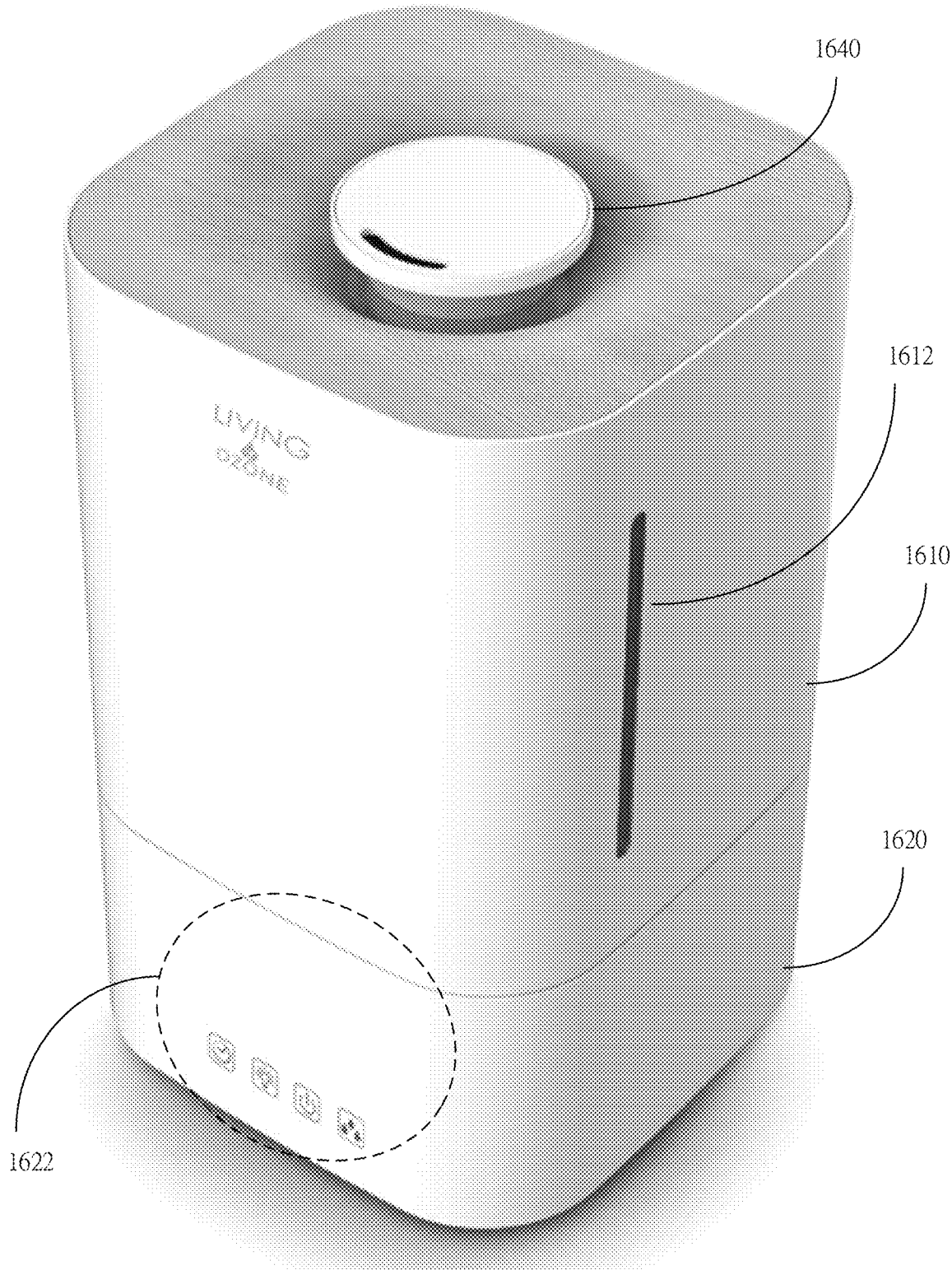
FIG. 16 is a frontal view of an ozone-based humidifier 1600 in accordance with an embodiment of the present application.

Please refer to FIG. 16, which is a frontal view of an ozone-based humidifier 1600 in accordance with an embodiment of the present application. The ozone-based humidifier 1600 may include a water tank 1610, an electric compartment 1620 below the water tank 1610, an ozone generator installed in the humidifier 1600, and a vapor nozzle 1640 on top of the water tank 1610.

The ozone generator may include the ozone generation assembly 400 as shown in FIG. 4 or the ozone generation assembly 600 as shown in FIG. 6. Unlike the ozone generation assemblies 900 and 1100, both the ozone generation assemblies 400 and 600 have no water inlet and water outlet because the water tank 1610 is installed above the electric compartment 1620. An observation window 1612 may be provided so as the user can observe the water level inside the water tank 1610. The ozone solution diffuses in the water tank 1610. A heater, a pump, and/or a sprayer may be included in the vapor nozzle 1640 for vaporizing the ozone solution in the water tank 1610 and spraying the ozone solution vapor into the air. The vapor nozzle 1640 may be opened or taken off so as the user can fill water into the water tank 1610.

There may exists a control panel 1622 in front of the electric compartment 1620. A power switch is configured for turning on or off the humidifier. Measured and/or set humidity may be shown by a display panel, LEDs, or lights on the panel. There may be various indicator lights to warn the user about empty water tank and to indicate that ozone generation status.

Figure 17:
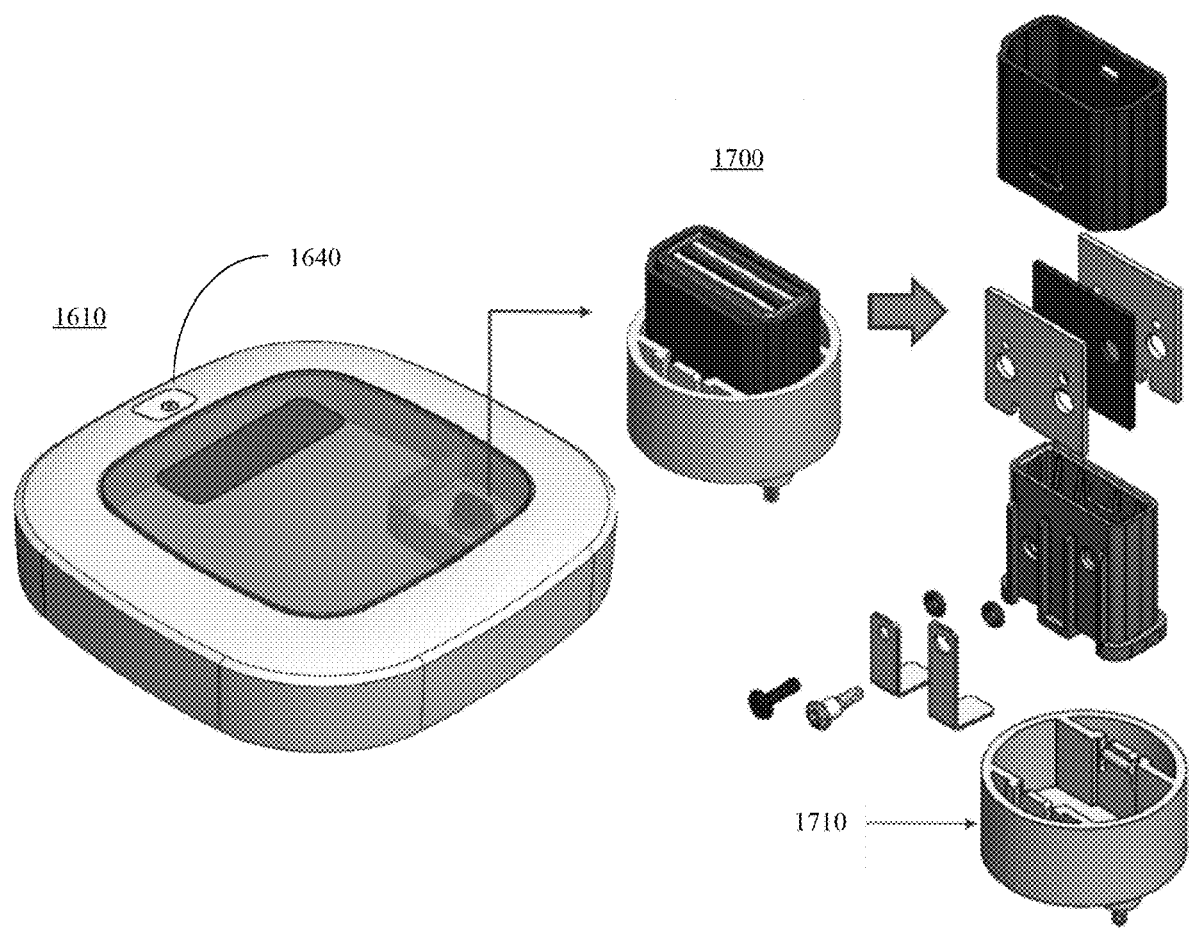
FIG. 17 illustrates a water tank 1610 of an ozone-based humidifier in accordance with an embodiment of the present application.

Please refer to FIG. 17, which illustrates a water tank 1610 of an ozone-based humidifier in accordance with an embodiment of the present application. The water tank 1610 may include a transparent cap and a vapor nozzle 1640. An electric compartment may be arranged below the water tank 1610 in an embodiment. Alternatively, the electric compartment may be arranged in the perimeter of the water tank 1610. Persons having ordinary skill in the art may understand that there are circuits for coupling the ozone generation assembly 400 or 1700 from the electric compartment.

A module of ozone generation assembly 1700 is shown in the middle of FIG. 17. The ozone generation assembly 1700 may be a variant of the ozone generation assembly 400 as shown in FIG. 4. Right hand side of FIG. 17 is an exploded view of the variant of the ozone generation assembly 1700. Comparing with the ozone generation assembly 400 as shown in FIG. 4, the bottom covering part 410 is integrated with the base part 1710 to provide a hollow compartment for the supporting part 460. And a wall structure is placed in the perimeter of the base part 1710. The base part 1710 is quite like the base part 910 as shown in FIG. 9. The difference between the base parts 910 and 1710 is that there is no opening in the middle for the water outlet.

Analogously, there may be an O-ring seal surrounding the base part 1710 for preventing leakage from the water tank 1610 to the electric compartment.

Figure 18:
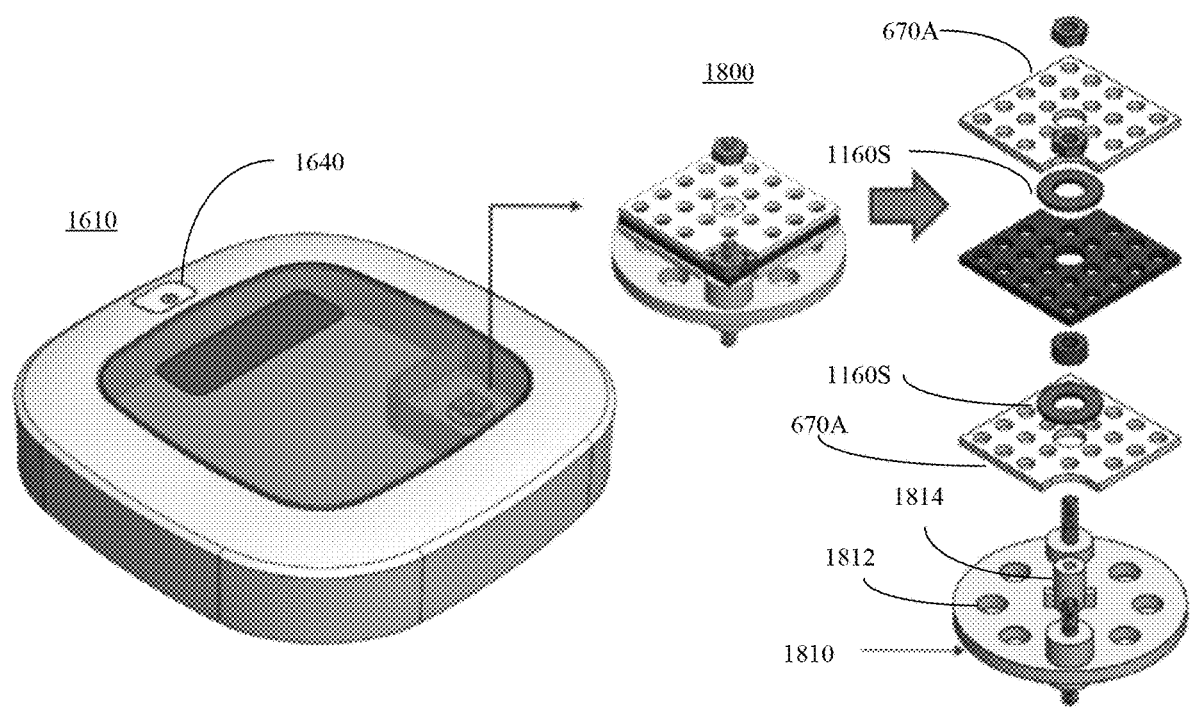
FIG. 18 illustrates a water tank 1610 of an ozone-based humidifier in accordance with another embodiment of the present application.

Please refer to FIG. 18, which illustrates a water tank 1610 of an ozone-based humidifier in accordance with another embodiment of the present application. Comparing with the water tank 1610 as shown in FIG. 17, a variant of the ozone generation assembly 1800 is shown in the middle of FIG. 18. Comparing with the ozone generation assembly 600 as shown in FIG. 6, the ozone generation assembly 1800 as shown in FIG. 18 replaces the base part 610 with the base part 1810.

There are several holes 1812 of the base part 1810 to assist ozone solution diffusion. The conner supporting parts 660C and the wall structure of the base part 610 are omitted on the base part 1810. Instead, the base part 1810 includes a supporting part 1814 protruding in the middle of the surface. The supporting parts 1160S can be placed and aligned with the supporting part 1814. Comparing with the ozone generation assembly 1100 as shown in FIG. 11, the top covering part 1180T is also omitted in the ozone generation assembly 1800.

As shown in FIG. 16, an indoor humidifier is innovative globally first one humidifier based on Ozone comparing to the traditional humidifier. Featuring characteristics of this product include indoor humidification, odor removal, sterilization, etc.

In one aspect of combinable with the general implementation, protections of ozone generation techniques: the core technique of the ozone-based humidifier is to electrolyze water with TDS 30~1000 ppm (equivalent to EC, electrical conductivity, 60~2000 us/cm) by tailored made titanium anode and cathode plates. It takes low voltage direct current 6V~36V to highly efficiently electrolyze water which can generate ozone dissolved in the water in a short time. An advantage of this design is free of hazardous substances generated. Utilizing it in daily life contributes to achieve optimal personal health protections.

In one aspect combinable with the general implementation, an ozone generation module structure applicable to water with TDS 30~1000 ppm is protected by adopting the module as shown in FIG. 17. The design is suitable for production and replaceable in the terminal products by users. Applicable variants are in the scope of the ozone-based indoor health protection humidifier.

In one aspect combinable with the general implementation, an ozone generation stacking structure applicable to water with TDS 30~1000 ppm is protected by adopting the stack as shown in FIG. 18. Applicable variants are in the scope of the ozone-based indoor health protection humidifier.

According to an embodiment of the present application, an ozone generation assembly of an ozone generator is provided. The ozone generation assembly comprising: a base part; two or more electrode plates in parallel to a plane; electric coupling heads which are arranged in vias of the base part so as both ends of each of the electric coupling heads are in opposite sides of the base part, respectively, wherein the electric coupling heads are configured to receive electricity from a circuitry part of the ozone generator; and one or more supporting parts configured for fixing the electrode plates to the base part, wherein the electrode plates are electrically connected with the electric coupling heads.

Preferably, in order to enclose the electrode plates in the ozone generation assembly 400, the ozone generation assembly further comprises: a bottom covering part attached to a surface of the base part, wherein first ends of the electric coupling heads are encircled by the bottom covering part, wherein the supporting part for enclosing the electrode plates; and a top covering part, wherein the plane is perpendicular to the surface of the base part, and wherein the top covering part and the bottom covering part are configured for enclosing the supporting part, the electrode plates, and the circuits.

Preferably, in order to electrically connect to the circuitry part of the ozone generator, the ozone generation assembly further comprise conductive circuits bent perpendicularly; and conductive screws, wherein first ends of the conductive circuits are electrically coupled to the first ends of the electric coupling heads, respectively, wherein second ends of the conductive circuits having openings, wherein the supporting part has corresponding openings such that the conductive screws are in touch with the electrode plates via the openings of the conductive circuits and the openings of the supporting part, respectively.

Preferably, in order to prevent leakage from the ozone generation assembly to the underneath, wherein the ozone generation assembly further comprises an O-ring seal around the base part.

Preferably, in order to fix the top covering part to the bottom covering part, wherein the top covering part has one or more fastens and the bottom covering part has one or more corresponding fastens such that the top and bottom covering parts are attached to each other by the fastens.

Preferably, to enclose the electrode plates in the ozone generation assembly 600, the ozone generation assembly further comprises: one or more dielectric supporting parts lie in between the electrode plates, wherein a surface of the base part is in parallel to the plane, wherein a first corner of a first one of the electrode plates is electrically coupled to one of the electric coupling heads protruding out of the surface, a second corner of the first one of the electrode plates diagonal to the first corner diagonal to the first corner of the first one of the electrode plates is missed, wherein a second corner of the second one of the electrode plates is electrically coupled to another one of the electric coupling heads, wherein the missed second corner of the first one of the electrode plates makes room for said another one of the electric coupling heads.

Preferably, in order to enclose a third electrode plate in the ozone generation assembly 600, wherein a first corner of the second one of the electrode plates is missed, wherein a first corner of a third one of the electrode plates is electrically coupled to the one of the electric coupling heads, wherein the missed first corner of the second one of the electrode plates makes room for the one of the electric coupling heads.

Preferably, in order to enclose the electrode plates, the ozone generation assembly further comprises a top covering part, wherein the base part has a wall structure corresponding to the top covering part, wherein first ends of the electric coupling heads are encircled by the wall structure.

Preferably, in order to have openings to the water tank, wherein the top covering part has concentric openings.

Preferably, in order to increase surface areas of the electrode plates, wherein the electrode plates have holes.

Preferably, in order to support rectangular electrode plates, wherein the electrode plates are rectangular, wherein there are corner supporting parts on the surface of the base part for fixing four corners of the electrode plates.

Preferably, in order to support the first (bottom) one of the electrode plates, the ozone generation assembly further comprises base supporting parts on the surface of the base part, wherein the first one of the electrode plates is in contact with the base supporting parts.

Preferably, in order to let the electric coupling heads in contact with the electrode plates, wherein the one or more dielectric supporting parts are rectangular, and two diagonal corners of the one or more supporting parts are missing to make room for the electric coupling heads.

Preferably, in order to pump water via the ozone generation assembly 900, the ozone generation assembly further comprises: a top covering part having an opening as a water inlet, wherein the supporting part has a tube as a water outlet, wherein the top covering part is attached to the supporting part by hot melt glue to enclose the electrode plates, wherein the base part has an opening in the middle for placing the tube.

Preferably, in order to pump water via the ozone generation assembly 1100, the ozone generation assembly further comprises: a top covering part having an opening as a water inlet, wherein the base part has a wall structure in the perimeter, so as the top covering part is attached to the wall structure by hot melt glue to enclose the electrode plates, wherein the supporting part is a tube in the middle of the base part as a water outlet.

Preferably, in order to let the electric coupling heads in contact with the electrode plates, wherein the one or more dielectric supporting parts have an opening in the middle corresponding to the supporting part.

Preferably, in order to suck water from the bottom of the water tank, wherein the ozone generation assembly further comprises a pipe, wherein a first end of the pipe connects to the water outlet, and a second end of pipe is a weighted head.

According to an embodiment of the present application, an ozone-based water bottle is provided. The ozone-based water bottle comprising: a water tank; an electric compartment below the water tank; the aforementioned ozone generator; and a cap of the water tank, wherein the circuitry part is inside the electric compartment and the ozone generation assembly is installed in the opening of the electric compartment facing the water tank.

According to an embodiment of the present application, an ozone-based water irrigator is provided. The ozone-based water irrigator comprising: a water tank; an electric compartment on top of the water tank; the aforementioned ozone generator; a pump; and a nozzle on top of the electric compartment, wherein the circuitry part is inside the electric compartment and the ozone generation assembly is installed in the opening of the electric compartment facing the water tank, wherein the pump is configured to pump water from the water tank to the nozzle via the ozone generation assembly.

Preferably, in order to fill water into the water tank, the water tank has a cap underneath or in the lower part.

Preferably, in order to fill water into the water tank, the water tank is detachable from the water tank.

Preferably, in order to reduce volume of the water irrigator, the electric compartment is movable into the water tank.

According to an embodiment of the present application, an ozone-based toothbrush is provided. The ozone-based toothbrush comprising: a water tank; an electric compartment on top of the water tank; the aforementioned ozone generator; a pump; and a toothbrush part on top of the electric compartment, wherein the circuitry part is inside the electric compartment and the ozone generation assembly is installed in the opening of the electric compartment facing the water tank, wherein the pump is configured to pump water from the water tank to the toothbrush part via the ozone generation assembly.

Preferably, in order to fill water into the water tank, the water tank has a cap underneath or in the lower part.

Preferably, in order to fill water into the water tank, the water tank is detachable from the water tank.

According to an embodiment of the present application, an ozone-based humidifier is provided. The ozone-based humidifier comprising: a water tank; an electric compartment below the water tank; the aforementioned ozone generator, and a vapor nozzle, wherein the circuitry part is inside the electric compartment and the ozone generation assembly is installed in the opening of the electric compartment facing the water tank.

One of the advantages provided by the present application is to provide ozone solution in the devices or appliances such as ozone-based water bottle, water irrigator, toothbrush, and humidifier to sterilization, disinfection, odor removal, and personal health care and hygiene for environments.

Another one of the advantages provided by the present application is to provide a modular design of the ozone generation assembly of the ozone generator in the devices or appliances. This modularization can save user's money because the replaceable ozone generation assembly can be bought independently. Furthermore, the user can take the ozone generation assembly out of the devices or appliances to clean it.

While this specification contains many specific implementation details, these should not be construed as limitations on the scope of any inventions or of what may be claimed later, but rather as descriptions of features specific to particular implementations of particular inventions.

Certain features that are described in this specification in the context of separate implementations can also be implemented in combination with in a single implementation. Conversely, various features that are described in the context of a single implementation can also be implemented in multiple separately or in any suitable sub-combination.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An ozone generation assembly of an ozone generator comprising:
   a base part having a wall structure about its perimeter and a hollow compartment within;
   two or more electrode plates in parallel to a plane;
   at least one dielectric supporting part, sandwiched between and electrically isolating respective adjacent ones of the two or more electrode plates from each other, the at least one dielectric supporting part being substantially the same shape and size as the two or more electrode plates;
   electric coupling heads arranged in vias of the base part, wherein opposite ends of each of the electric coupling heads are in opposite sides of the base part, respectively, and the electric coupling heads receive electricity from a circuitry part;
   a supporting part affixing the electrode plates and the at least one dielectric supporting part to each other and the base part, positioned in the hollow compartment, wherein the electrode plates are electrically connected with the electric coupling heads, the supporting part being tube-shaped;
   a top covering part, securely attached to the supporting part and the wall structure, thereby enclosing the two or more electrode plates in the supporting part;
   conductive circuits having a perpendicular bend; and
   conductive screws,
   wherein first ends of the conductive circuits are electrically coupled to the first ends of the electric coupling heads, respectively,
   wherein second ends of the conductive circuits having openings, wherein the supporting part has corresponding openings such that the conductive screws contact respective ones of the electrode plates and the conductive circuits via an opening of the conductive circuits and the corresponding openings of the supporting part, respectively.

2. The ozone generation assembly of claim 1, further comprising:
a bottom covering part attached to a surface of the base part, wherein first ends of the electric coupling heads are encircled by the bottom covering part;
wherein the plane is perpendicular to the surface of the base part, and the top covering part and the bottom covering part are configured for enclosing the at least one dielectric supporting part and the electrode plates in the supporting part.

3. The ozone generation assembly of claim 1, further comprises comprising:
an O-ring seal around the base part.

4. The ozone generation assembly of claim 2, wherein the top covering part has one or more fastens and the bottom covering part has one or more corresponding fastens such that the top and bottom covering parts are attached to each other by the fastens.

5. The ozone generation assembly of claim 1,
wherein the at least one dielectric supporting parts are positioned between each adjacent pair of electrode plates,
wherein a surface of the base part is in parallel to the plane,
wherein a first corner of a first one of the electrode plates is electrically coupled to one of the electric coupling heads protruding out of the surface, a second corner of the first one of the electrode plates diagonal to the first corner of the first one of the electrode plates is missed,
wherein a second corner of the second one of the electrode plates is electrically coupled to another one of the electric coupling heads, wherein the missed second corner of the first one of the electrode plates makes room for said another one of the electric coupling heads.

6. The ozone generation assembly of claim 5, wherein a first corner of the second one of the electrode plates is missed, wherein a first corner of a third one of the electrode plates is electrically coupled to the one of the electric coupling heads, wherein the missed first corner of the second one of the electrode plates makes room for the one of the electric coupling heads.

7. The ozone generation assembly of claim 1, wherein the wall structure of the base part corresponds to the top covering part, and first ends of the electric coupling heads are encircled by the wall structure.

8. The ozone generation assembly of claim 7, wherein the top covering part has concentric openings.

9. The ozone generation assembly of claim 1, wherein electrode plates have holes.

10. The ozone generation assembly of claim 5, wherein the electrode plates are rectangular, wherein there are corner supporting parts on the surface of the base part for fixing four corners of the electrode plates.

11. The ozone generation assembly of claim 5, further comprises base supporting parts on the surface of the base part, wherein the first one of the electrode plates is in contact with the base supporting parts.

12. The ozone generation assembly of claim 5, wherein the at least one dielectric supporting parts are rectangular, and two diagonal corners of the at least one dielectric supporting parts are missing to make room for the electric coupling heads.

13. The ozone generation assembly of claim 1,
wherein the supporting part has a water outlet, wherein the top covering part is attached to the supporting part by hot melt glue to enclose the electrode plates;
wherein the base part has a central opening mating with the water outlet; and
wherein the top covering part is connected to and receives water from a weighted head.

14. The ozone generation assembly of claim 1,
wherein the top covering part has an opening as a water inlet enabling water to enter the supporting part and interact with the two or more electrode plates;
wherein the top covering part is attached to the wall structure by hot melt glue to enclose the two or more electrode plates in the supporting part;
wherein the supporting part is positioned in the middle of the base part as a water outlet.

15. The ozone generation assembly of claim 1, wherein the ozone generator is configured to electrolyze water with total dissolved solid (TDS) 30~1000 ppm or electrical conductivity (EC) 60~2000 us/cm to generate ozone solution.

16. The ozone generation assembly of claim 1, wherein the ozone generation assembly is installed in an ozone-based water bottle, and the ozone-based water bottle further comprises:
a water tank;
an electric compartment below the water tank; and
a cap of the water tank;
wherein the circuitry part is inside the electric compartment and the ozone generation assembly is installed in the opening of the electric compartment facing the water tank.

17. The ozone generation assembly of claim 1, wherein the ozone generation assembly is installed in an ozone-based water irrigator, and the ozone-based water irrigator further comprises:
a water tank;
an electric compartment on top of the water tank;
a pump; and
a nozzle on top of the electric compartment;
wherein the circuitry part is inside the electric compartment and the ozone generation assembly is installed in the opening of the electric compartment facing the water tank;
wherein the pump is configured to pump water from the water tank to the nozzle via the ozone generation assembly;
wherein the water tank has a cap underneath or in the lower part;
wherein the water tank is detachable from the electric compartment; and
wherein the electric compartment is movable into the water tank.

18. The ozone generation assembly of claim 1, wherein the ozone generation assembly is installed in an ozone-based toothbrush, the ozone-based toothbrush further comprises:
a water tank;
an electric compartment on top of the water tank;
a pump; and
a toothbrush part on top of the electric compartment;

wherein the circuitry part is inside the electric compartment and the ozone generation assembly is installed in the opening of the electric compartment facing the water tank;

wherein the pump is configured to pump water from the water tank to the toothbrush part via the ozone generation assembly;

wherein the water tank has a cap underneath or in the lower part; and wherein the water tank is detachable from the electric compartment.

19. The ozone generation assembly of claim 1, wherein the ozone generation assembly is installed in an ozone-based humidifier, the ozone-based humidifier further comprises:

a water tank;

an electric compartment below the water tank;

a vapor nozzle;

wherein the circuitry part is inside the electric compartment and the ozone generation assembly is installed in the opening of the electric compartment facing the water tank.

\* \* \* \* \*